(12) United States Patent
Grainger et al.

(10) Patent No.: US 11,774,773 B1
(45) Date of Patent: Oct. 3, 2023

(54) COUPLERS FOR OPTICAL DEVICES FOR REFLECTED LIGHT AND FLUORESCENCE DETECTION AND METHODS FOR USE

(71) Applicant: CTL Analyzers LLC, Shaker Heights, OH (US)

(72) Inventors: Ryan Grainger, Shaker Heights, OH (US); Ryan Bischof, Cleveland, OH (US)

(73) Assignee: CTL ANALYZERS LLC, Shaker Heights, OH (US)

( * ) Notice: Subject to any disclaimer, the term of this patent is extended or adjusted under 35 U.S.C. 154(b) by 0 days.

(21) Appl. No.: 18/082,370

(22) Filed: Dec. 15, 2022

Related U.S. Application Data

(60) Provisional application No. 63/419,083, filed on Oct. 25, 2022.

(51) Int. Cl.
*G02B 5/122* (2006.01)
*G02B 27/14* (2006.01)
*G02B 21/16* (2006.01)

(52) U.S. Cl.
CPC ........... *G02B 27/141* (2013.01); *G02B 5/122* (2013.01); *G02B 21/16* (2013.01)

(58) Field of Classification Search
CPC ...... G02B 27/141; G02B 5/122; G02B 21/16; G02B 21/24; G02B 21/362;
(Continued)

(56) References Cited

U.S. PATENT DOCUMENTS

| 5,719,699 A * | 2/1998 | Otomo | G02B 7/16 |
| | | | 250/201.3 |
| 2005/0078376 A1* | 4/2005 | Gupta | G02B 6/4214 |
| | | | 359/618 |

(Continued)

FOREIGN PATENT DOCUMENTS

JP        H1062693 A  *  3/1998

OTHER PUBLICATIONS

Molecular_Devices_SpectrMax_User_Guide_pp. 1_to_18_Jun. 2022_Molecular_Devices_USA.
(Continued)

*Primary Examiner* — Mustak Choudhury
(74) *Attorney, Agent, or Firm* — D. Benjamin Borson; BORSON LAW GROUP PC

(57) ABSTRACT

Embodiments of this disclosure comprise of an optical cube, a light source, a cube holder connection point, a plurality of pins, a plurality of cavities sized and configured to receive said pins, a magnet, and a magnetic element located to attract and adhere to said magnet. An optical device with coaxial illumination for reflected light and fluorescence detection includes one or more optical cubes to redirect light along the optical axis. The cube holder connection point can be in a fixed position, moved translationally, or moved rotationally to engage a cube within the optical device. An optical cube can be attached to the cube holder connection point utilizing locating pins and magnetic coupling to constrain all 6 degrees of freedom. Use of such devices reduces the need to use screws or other locking hardware and permits a larger number of optical cubes to be inserted in the same area and makes it easier to exchange optical cubes.

14 Claims, 20 Drawing Sheets

(58) Field of Classification Search
CPC .... G02B 2027/0123; G02B 2027/0138; G02B 2027/014; G02B 2027/0156; G02B 2027/0158; G02B 2027/0178; G02B 2027/00; G02B 6/3829; G02B 6/3838; G02B 6/3849; G02B 6/3866; G02B 6/3878; G02B 6/3882; G02B 6/3885; G02B 6/3897; G02B 6/475; G02B 1/06
See application file for complete search history.

(56) References Cited

U.S. PATENT DOCUMENTS

2015/0355481 A1* 12/2015 Hilkes ................. A61B 3/04
                                                    351/227
2018/0245433 A1*  8/2018 Fuehring ............. F16B 7/187

OTHER PUBLICATIONS

Molecular_Devices_SpectrMax_User_Guide_pp.19_to_48_Jun.2022_Molecular_Devices_USA.

\* cited by examiner

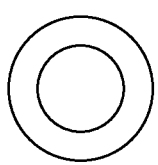 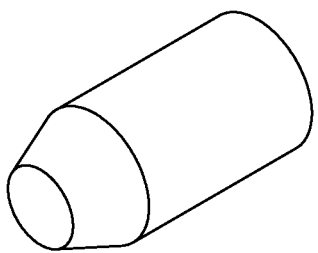 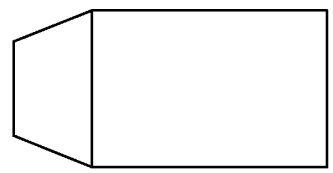
35
FIG. 10A  FIG. 10B  FIG. 10C
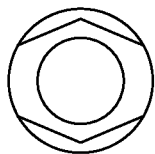 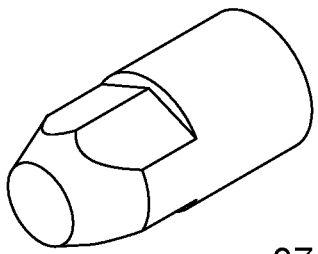 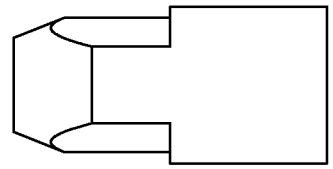
37
FIG. 11A  FIG. 11B  FIG. 11C
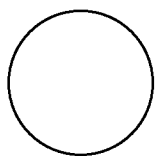 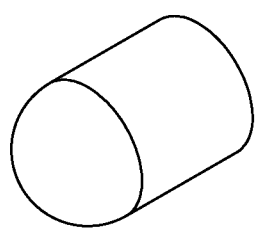 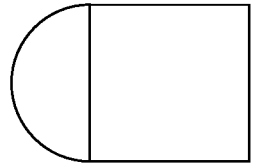
36
FIG. 12A  FIG. 12B  FIG. 12C

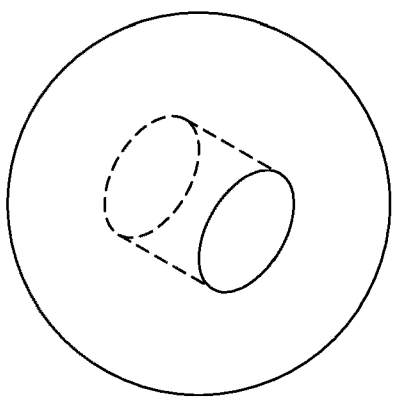
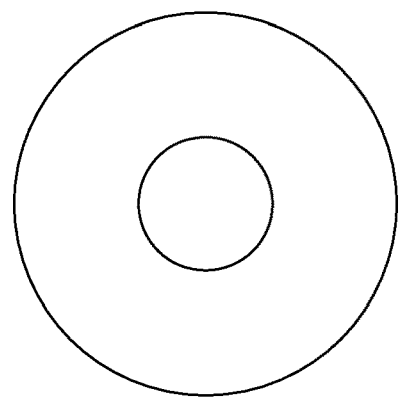
40
FIG. 13A  FIG. 13B
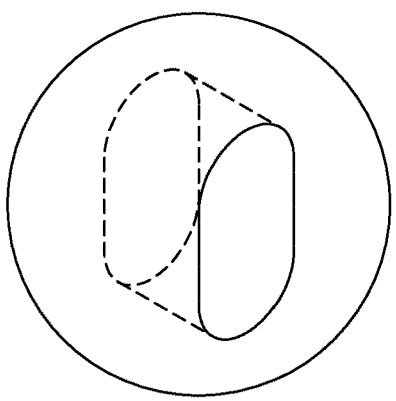
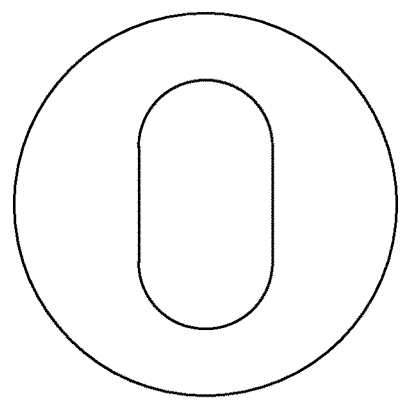
41
FIG. 14A  FIG. 14B
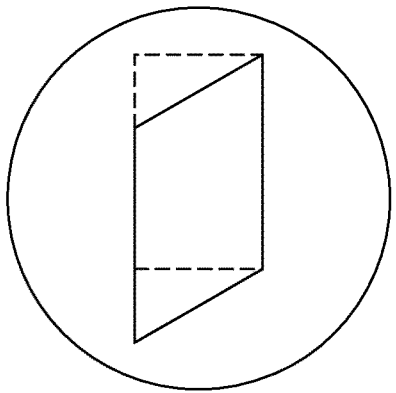
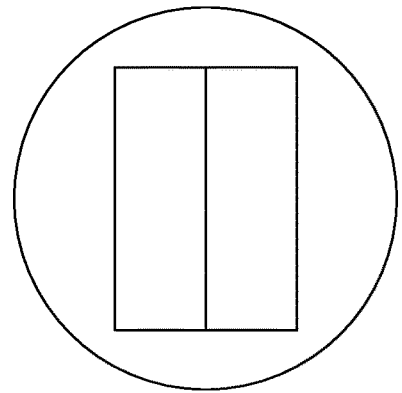
42
FIG. 15A  FIG. 15B

2200

COUPLERS FOR OPTICAL DEVICES FOR REFLECTED LIGHT AND FLUORESCENCE DETECTION AND METHODS FOR USE

Claim of Priority

This application claims priority to U.S. Provisional Patent Application No. 63/419,083 filed 25 Oct. 2022. The contents of this provisional application are herein incorporated fully by reference.

Field of the Disclosure

This disclosure relates to an improved coupling method for optical devices with coaxial illumination for reflected light and fluorescence detection and uses thereof. In particular, this disclosure relates to improved devices and methods of attachment to more easily locate and affix optical cubes within an optical device.

BACKGROUND

Optical devices with coaxial illumination are systems in which the light is directed along the optical axis of the other components towards an object of interest and a detector. Typically, optical devices contain a detector, upper optical component, lower optical component, and light source. Examples of detectors include digital cameras, microscope eye pieces, photodiodes, PMTs or other light detecting devices. Upper optical components are typically a zoom module while lower optical components are typically a focus module. Examples of light sources are LEDs, halogen bulbs, lasers, etc. Optical cubes are optical devices with a dichroic or semitransparent mirror and typically placed in between the upper and lower optical components in order to achieve coaxial illumination. As an option, optical cubes can be used to filter illuminating light (directed toward the sample) and light reflected or emitted by the sample (directed toward a detector) to certain wavelengths or provide some other light manipulation. Examples of optical devices with coaxial illumination include ELISPOT analyzers, optical and fluorescent microscopes, machine vision systems and flow cytometers.

An optical cube, also known, for example, as a microscope cube, filter cube, fluorescent cube, comprises a mirror within a housing, for which incident light enters the optical cube on one side of the cube, where the mirror is arranged at a 45-degree angle to the path of incident light and optical axis. The mirror may be semitransparent for the reflected light detection or dichroic, trichroic (or more), allowing partial transmission of certain wavelengths for the fluorescence. Instead of a mirror, an optical cube may comprise of a prism or any other type of light directing element. The incident light from the light source is directed 90 degrees towards the object of interest along the optical axis of the system. As an option, an optical cube may contain side and/or top optical filters to further separate the incident (excitation) light from the fluorescent light emitted by a sample based on their wavelengths. An optical cube can be attached to coaxial optical systems through a connection point which is defined as the interface between the coupling components and an optical device.

SUMMARY

We have developed new devices and methods permitting highly accurate, reproducible attachment and alignment of an optical cube within an optical device having a light source to illuminate a sample to be analyzed. In an embodiment of this disclosure, an optical cube contains a housing and a mirror mounted inside it, typically (but not limited to) at an angle of 45-degrees to the path of incident light and optical axis. An optical cube may have side and/or top optical filters. An optical cube can be attached to an optical device, and aligned to the optical axis, using a combination of locating pins and magnetic couplers.

In an embodiment of this disclosure, locating pins are elements to force alignment of an optical cube within the optical device. Locating pins can be varied as to shape and size, and can be press fit, screw in or manufactured as part of the cube holder connection point or coupling components.

In an embodiment of this disclosure, a magnetic component is an element which forces magnetic retainment of the cube within the optical device. An optical cube coupler is an element to facilitate optical cube use with a pin-magnetic system. An optical cube can have a female dovetail which slides onto a male dovetail on an optical cube coupler. An optical cube coupler lock fixes an optical cube to an optical cube coupler.

A cube holder connection point may have various configurations within the optical device including fixed, rotational, and translational configuration. A fixed cube holder connection point can hold one optical cube in position. A rotational cube holder connection point is an element which rotates about an axis to move one or more attached optical cubes in and out of position within the optical axis. In a multi-cube rotational configuration, rotating the cube holder connection point causes one optical cube to be removed from the light path and another to be placed within the light path. A translational cube holder connection point is an element which allows lateral movement of one or more attached optical cubes in and out of position within the optical axis.

In embodiments of this disclosure, new devices and methods for attachment of optical cubes to cube holder connection points can provide secure, resilient and stable relationships between optical cubes and optical devices.

A fixed system allows one cube to be changed out without disturbing the system as a whole. Optical elements and light source can remain in place while the exchange is made.

A translational system and a rotational system allow for several cubes to be swapped between and reconfigured outside an active system.

The upper optical element can be for zoom (increased magnification) and a lower optical element can be for focus.

A light source can be light emitting diode (LED), or fluorescent, or halogen, or incandescent, or laser, etc. from a direct or indirect source.

The quantity of optical cubes can depend upon the size of the system.

A dovetail adapter can be used. However, other styles of optical cube may require other styles of adapters.

BRIEF DESCRIPTION OF THE FIGURES

This disclosure contains embodiments as illustrated in the drawings, in which:

FIG. 5A depicts one view of embodiment 500.

FIG. 5B depicts an alternative view of embodiment 500 of this disclosure.

FIGS. 10A, 10B, and 10C depict alternative views of a "beveled" pin of embodiment 35 of this disclosure.

FIGS. 11A, 11B, and 11C depict alternative views of a "diamond shaped" pin of embodiment 37 of this disclosure.

FIGS. 12A, 12B, and 12C depict alternative views of round (or hemispherical) top of pin 36 of this disclosure.

FIGS. 13A, and 13B depict alternative views of a round hole cavity in an embodiment 40 of this disclosure.

FIGS. 14A, and 14B depict alternative views of a slotted cavity of embodiment 41 of this disclosure.

FIGS. 15A, and 15B depict alternative views of a grooved cavity of embodiment 42 of this disclosure.

FIG. 22A shows the alignment of locating pins attached to cube holder connection point 25 and aligned with holes on optical cube coupler 15. FIG. 22B shows optical cube coupler interlocked with optical cube 5. FIG. 22C depicts a top view of optical cube 5, optical cube coupler 15, and cube holder connection point 25. FIG. 22D depicts a side view of an embodiment showing optical cube coupler 15 and optical cube 5 showing pins on cube holder connection point 25 aligned with cavities on optical cube coupler 15 (not shown).

FIG. 23A shows a fixed system with the optical cube removed. FIG. 23B depicts an assembled optical cube for a fixed system.

DETAILED DESCRIPTION

Definitions

Figure 1:
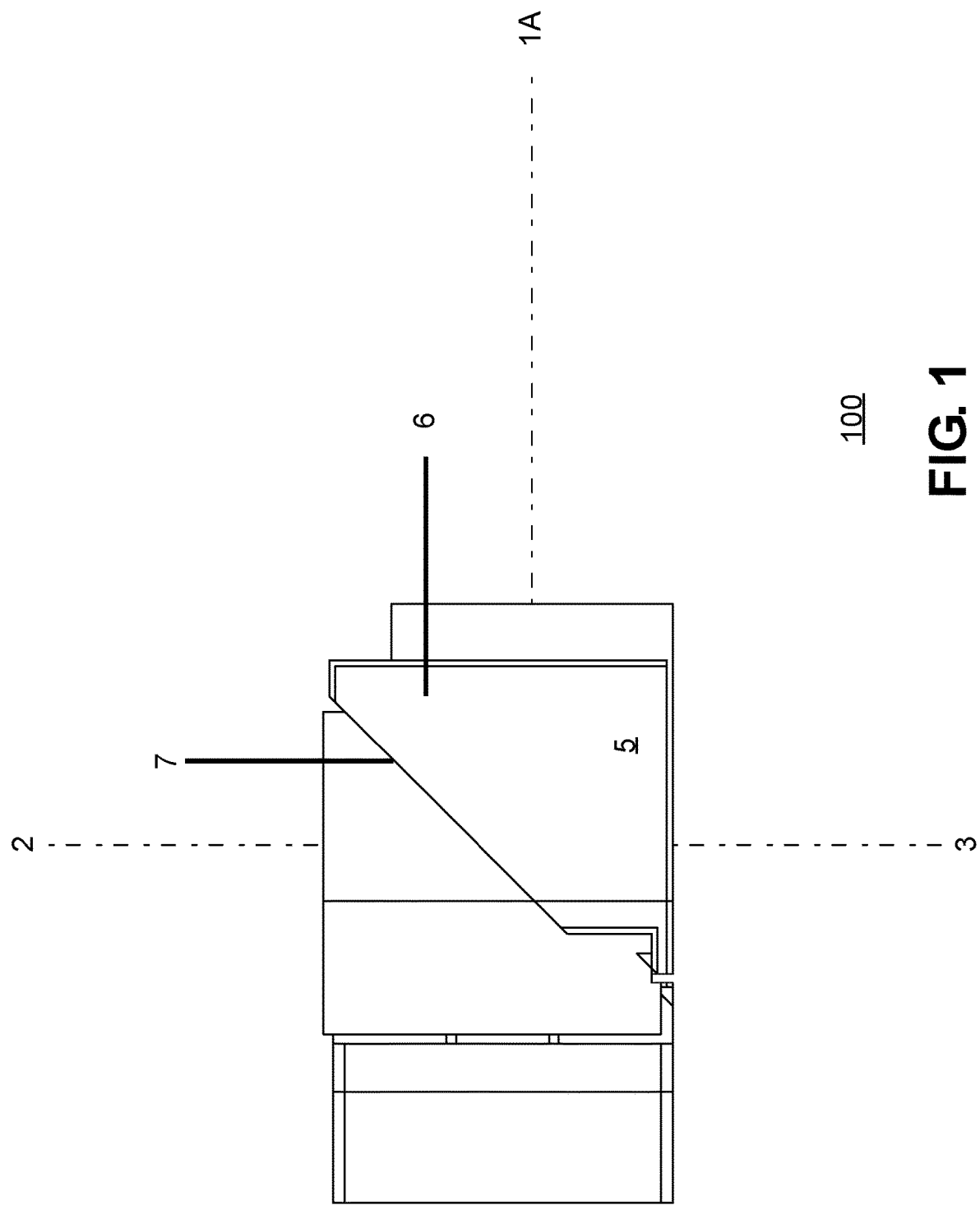
FIG. 1 depicts a side view 100 of an example optical cube 5, showing housing 6, with a general layout of the light path 1A for light source, object of interest to be analyzed 3, and viewing or imaging port 2 within an optical device and mirror 7.

The following components of this disclosure are referred to by numbering as follows:

Optical element is referred to element 1 throughout.

Optical cubes are referred to as elements 5 throughout.

Optical cube housing is referred to as elements 6 throughout.

Light path for light source is referred to elements 1A throughout

Object of interest to be analyzed is referred to as elements 3 throughout.

Viewing or imaging port is referred to as elements 2 throughout.

Optical device mirror is referred to as elements 7 throughout.

Optical cube coupler lock is referred to as elements 10 throughout.

Optical cube coupler is referred to as elements 15.

Magnetic component is referred to as elements 20.

Cube holder connection point, also known as cube coupler connection point or "hub" is referred to as elements 25.

Longitudinal axial hole is referred to as elements 26.

Magnet is referred to as elements 30.

Beveled locating pins are referred to as elements 35.

Round locating pins are referred to as elements 36.

Diamond shaped locating pins are referred to as elements 37.

Round cavities are referred to as elements 40.
Slotted cavities are referred to as elements 41.
Grooved cavities are referred to as elements 42.

Description of Embodiments

An optical cube contains a housing and a mirror mounted at an angle of 45-degrees to a light beam and optical axis.

FIG. 1 depicts a side view 100 of an example optical cube 5, showing housing 6, with a general layout of the light path 1A for light source, object of interest to be analyzed 3, and viewing/imaging port 2 within an optical device and mirror 7. An optical cube may have additional other side and/or top filters. An optical cube is attached to a cube holder connection point of an optical device and fixed into place using a combination of locating pins and magnetic couplers.

In an embodiment of this disclosure, locating pins are elements to force alignment of an optical cube within the optical device. Locating pins can be varied as to shape and size, and can be press fit, screw in, or manufactured as part of the cube holder connection point, which is a device that connects the optical cube to an optical device or coupling components.

In an embodiment of this disclosure, a magnetic component is an element which forces magnetic retainment of the cube within the optical device. An optical cube coupler is an element to facilitate optical cube use with a pin-magnetic system. An optical cube can have female dovetail slides onto male dovetail on an optical cube coupler. An optical cube coupler lock fixes an optical cube to an optical cube coupler.

Figure 2:
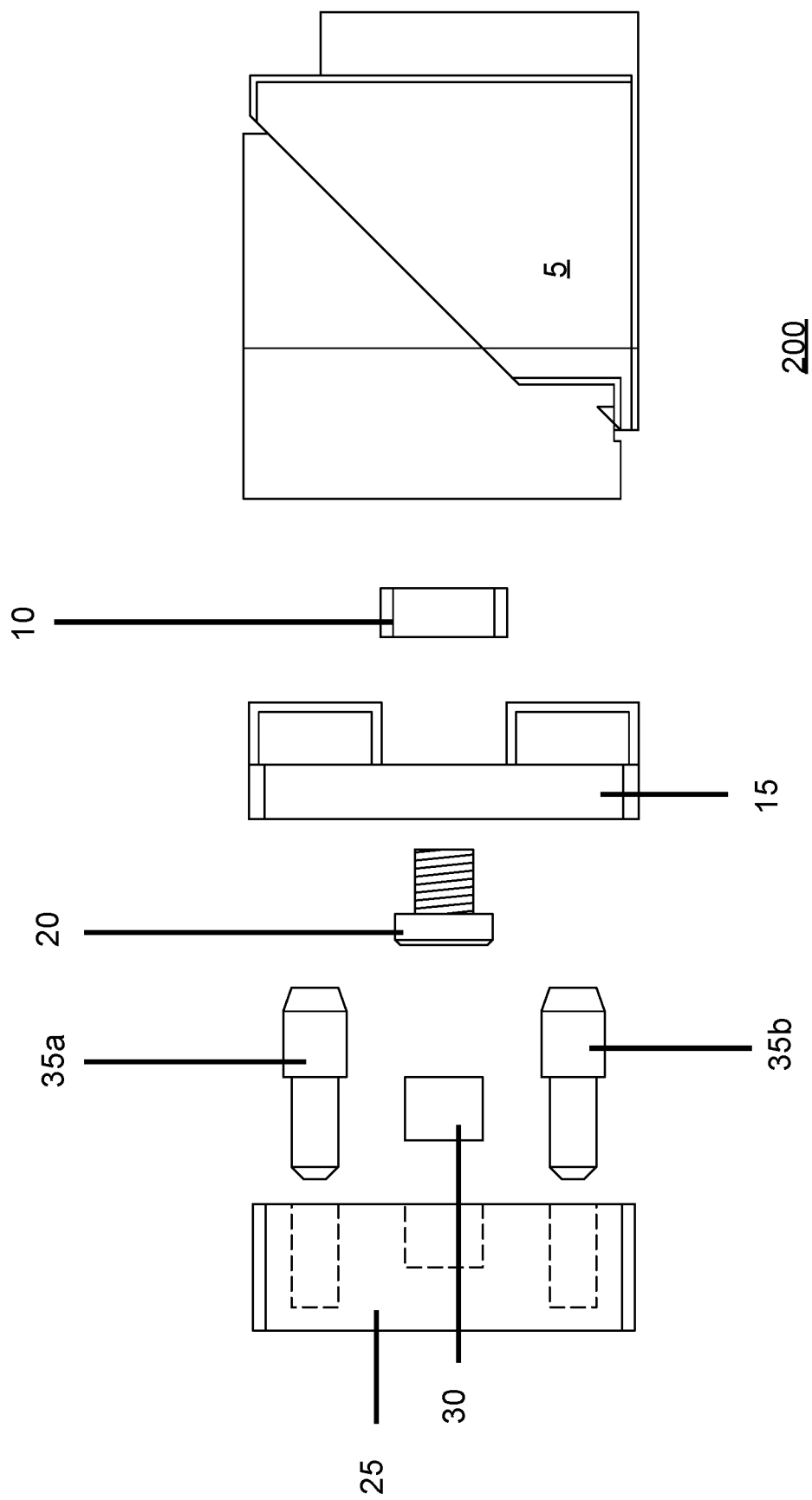
FIG. 2 depicts an exploded side view 200 of optical cube 5 and components for attachment to an optical device of this disclosure.

FIG. 2 depicts embodiment 200 of this disclosure showing optical cube 5, optical cube coupler lock 10, optical cube coupler 15, magnetic component 20, cube holder connection point 25, magnet 30, and two beveled locating pins 35*a* and 35*b*.

A cube holder connection point may have various configurations within the optical device including fixed, rotational, and translational configuration. A fixed cube holder connection point can hold one optical cube in position. A rotational cube holder connection point is an element which rotates about an axis to move one or more attached optical cubes in and out of position within the optical axis. In a multi-cube rotational configuration, rotating the cube holder connection point causes one optical cube to be removed from the light path and another to be placed within the light path. A translational cube holder connection point is an element which allows lateral movement of one or more attached optical cubes in and out of position within the optical axis.

In embodiments of this disclosure, new devices and methods of attachment of optical cubes to cube holder connection points can provide secure, resilient, and stable relationships between optical cubes and optical devices. The devices and methods represent a unique, new, and non-obvious improvement over prior art devices.

Figure 3:
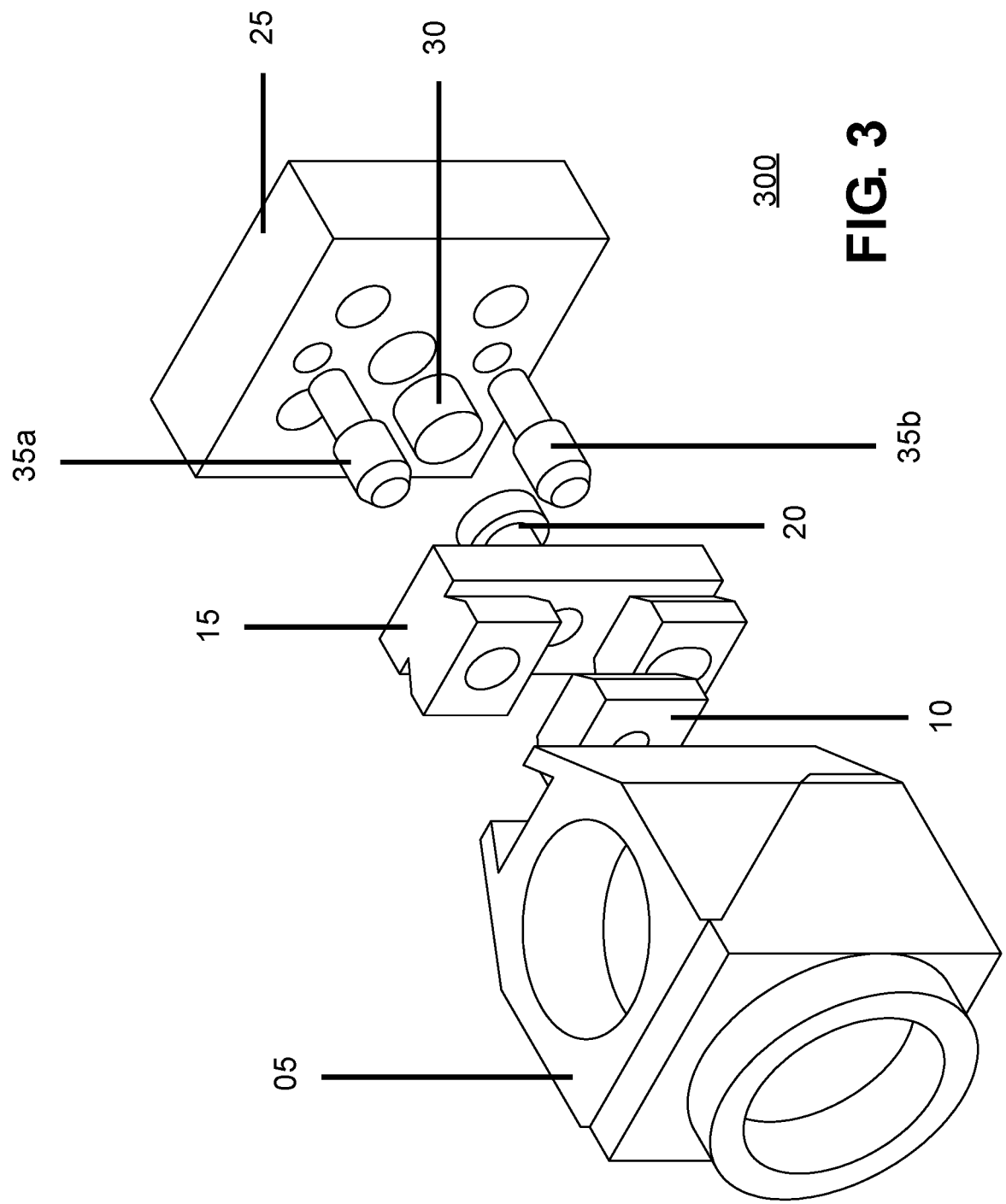
FIG. 3 depicts an isometric exploded view 300 of optical cube 5 and components for attachment to an optical device of this disclosure.

FIG. 3 depicts embodiment 300 of this disclosure, showing optical cube 5, optical cube coupler lock 10, optical cube coupler 15, magnetic component 20, cube holder connection point 25, magnet 30, and two beveled locating pins 35*a* and 35*b*.

Figure 4:
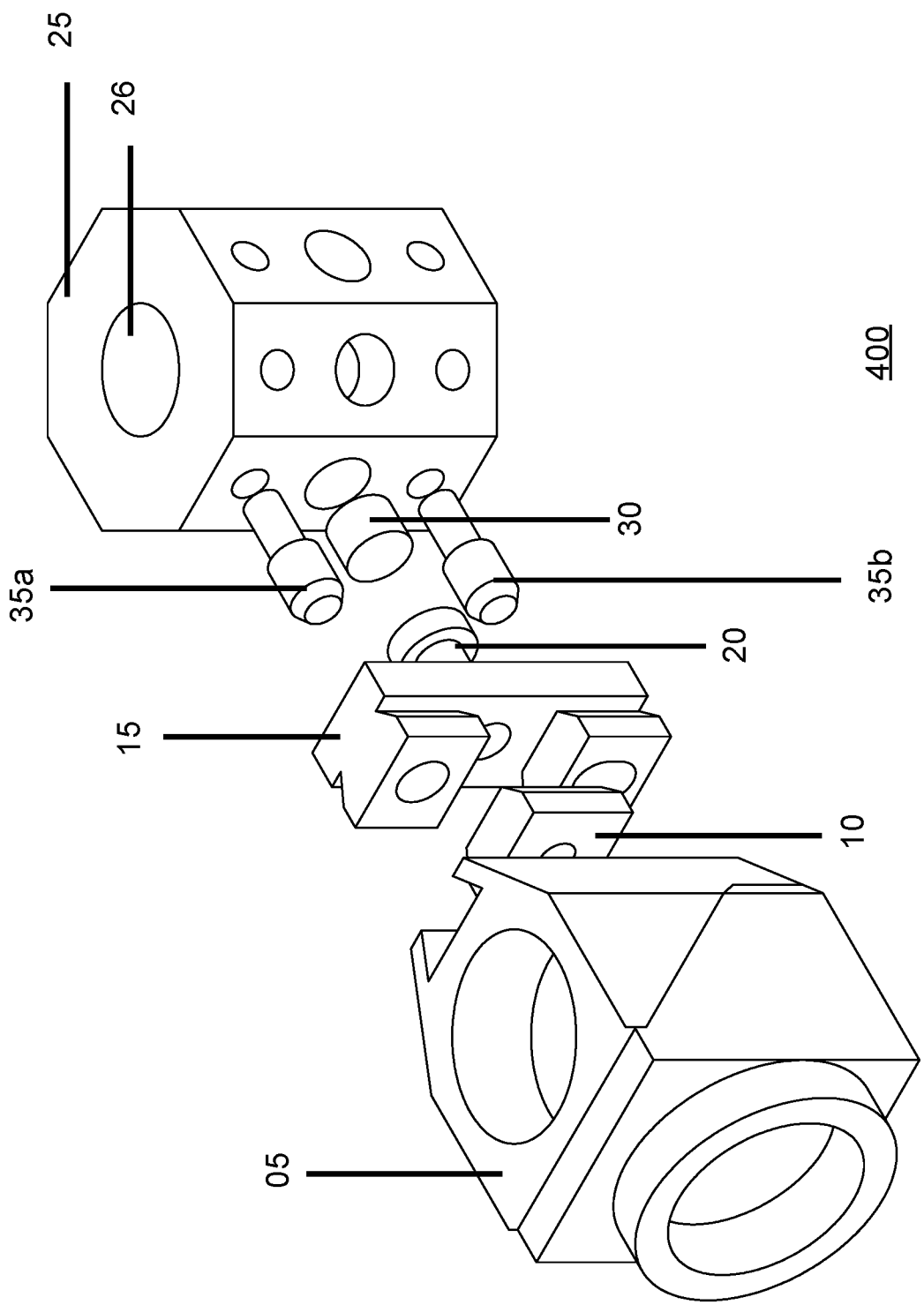
FIG. 4 depicts an isometric exploded view 400 of this disclosure, showing optical cube 5 and alternative components for attachment to an optical device of this disclosure.

FIG. 4 depicts embodiment 400 of this disclosure showing similar components as shown in FIG. 3. However, cube holder connection point 25 is shown as an 8-sided element having a longitudinal axial hole 26. Cube connection point 25 can be placed onto a rotatable shaft (not shown) to move the different sides to alternative locations.

An example of a prior art device is described in U.S. Pat. No. 7,502,164, hereinafter "Lytle" or the '164 patent.). The '164 patent discloses use of a horizontal carriage mounted on a microscope. Different optical cubes are arranged on the carriage. By rotating the carriage, optical cubes can be moved into or out of the optical axis. However, this configuration used dovetails to attach optical cubes to the carriage, or fixedly secured them to the carriage. Such configurations remove the ability to change individual cubes, require extra space for the dovetail, and require additional hardware to secure the cubes in position. This limits the number of cubes which can be used and increases difficulty in changing installed cubes.

In contrast to the prior art, the attachment devices and methods of this disclosure solves these problems. Different levels of constraints, pins, cavities, magnets, and other components can constrain the relative positions of different components in all 6 degrees of freedom to operate. Such systems are highly robust, and can produce highly accurate, reproducible results. Using the devices of this disclosure, it is possible to have the highest number of cubes in the smallest area compared to the prior art. This is because the attachment and alignment components are contained within the profile of the optical cube. The devices and methods also allow the cubes to be removed perpendicularly to the optical axis, further reducing the space required compared to other methods. The magnetic coupling makes it much easier to install and remove cubes by pulling them off the cube holder connection points and replacing them without screws or other locking hardware.

Aspects of the Disclosure

One aspect is a coupling device for attaching an optical cube to an optical device, comprising the components:
  a) an optical cube with a light source associated with said optical device;
  b) a cube holder connection point;
  c) a plurality of pins;
  d) a plurality of cavities sized and configured to accept said pins;
  e) a magnet; and
  f) a magnetic element located to attract and adhere to said magnetic component where said elements c) through f), when assembled, constrain the optical cube in 6 degrees of freedom.

A further aspect is a coupling device for attaching an optical cube to an optical device having a light source associated with said optical device, comprising the components:
  a) an optical cube;
  b) an optical cube coupler;
  c) an optical cube coupler lock located between said optical cube coupler and a magnetic element;
  d) a cube holder connection point having a plurality of locating pins;
  e) said optical cube having a plurality of cavities sized and configured to accept said pins;
  f) a magnet coupled to said cube holder connection point;
  g) a magnetic element located on said optical cube to attract and adhere to said magnet;
  h) attaching said components together with said optical cube;
  i) where said elements b) through g) when assembled constrain the optical cube in 6 degrees of freedom.

Another aspect is a device of any preceding or following aspect, where said cube holder connection point comprises:
a) a plurality of lateral faces; and
b) a concentric longitudinal hole through said cube holder connection point, said hole adapted to receive a spindle of said optical device.

A further aspect is a device of any preceding or following aspect, where one of said lateral faces of said cube holder connection point has an optical cube affixed thereto.

A further aspect is a device of any preceding or following aspects, wherein another lateral face of said cube holder connection point has another optical cube thereon, wherein said two optical cubes each has a mirror, and/or filters, specific for different wavelengths of light.

An additional aspect is a device of any preceding or following aspects, wherein a plurality of optical cubes are attached to different lateral faces of said cube holder connection point, where each optical cube has a mirror, and/or filters, specific for different wavelengths of light.

A still additional aspect is a device of any preceding or following aspects, wherein said optical cube and said cube holder connection point have a plurality of pins and respective cavities.

A further additional aspect is a device of any preceding aspects, where an optical cube coupler is used to adapt a prior existing optical cube to be able to use said pins and cavities.

An additional aspect is a device of any preceding or following aspects, where said pins have a shape of beveled, or round, or diamond, or mixtures thereof, and where each of said cavities is shaped and sized to receive a corresponding pin.

A still further aspect is a device of any preceding or following aspects, where said pins are affixed to said cube holder connection point and said cavities are located on said optical cube.

A still further aspect is a device of any preceding or following aspects, where said pins are affixed to said optical cube and said cavities are located on said cube holder connection point.

A further additional aspect is a device of any prior or following aspects, wherein said light source is a light emitting diode (LED), or fluorescent, or halogen, or incandescent, or laser.

Further aspects is a device of any prior or following aspects, where said assembled device can be moved in a translational or rotational direction.

Another aspect is a method of any prior or following aspects for analyzing a substance using an optical device with coaxial illumination, comprising;
a) obtaining an optical device with coaxial illumination and a light source associated with said optical device;
b) preparing one of more optical cubes, optical cube couplers, a plurality of pins, and a machine connecting point;
c) affixing said one or more optical cubes, with optical cube couplers, to said cube holder connection point to constrain said optical cubes in 6 degrees of freedom, thereby producing a completed cube holder connection point with optical cubes;
d) placing said completed cube holder connection point on a spindle of said optical device; and
e) detecting reflected or emitted light from a sample using one of said optical cubes;
f) rotating or moving translationally said cube holder connection point to place a different optical cube within the light path; and
g) detecting the reflected or emitted light from a sample using another of said optical cubes.

EXAMPLES

This disclosure is defined with respect to the text, figures, embodiments, and the examples that follow. It can be appreciated that those of skill in the art can adapt the disclosures herein to produce other embodiments that fall within the scope of this disclosure.

Example 1: Coupler of Optical Cube to Optical Device I

FIG. 3 depicts embodiment 300 of this disclosure, showing optical cube 5, optical cube coupler lock 10, optical cube coupler 15, magnetic component 20, cube holder connection point 25, magnet 30, and two locating pins 35a and 35b. Also shown is magnetic component 20 having a threaded portion for attaching the optical cube coupler to optical cube 5 utilizing the optical cube coupler lock 10. Two locating pins 35a and 35b are shown, one on either side of magnet 30. Locating pins 35a, 35b, and magnet 30 are shown outside of recesses in cube holder connection point 25.

FIG. 4 depicts an isometric exploded view 400 of this disclosure showing optical cube 5 on the left side and showing optical cube coupler lock 10, optical cube coupler 15, magnetic component 20 (middle portion of FIG. 4), two locating pins 35a, 35b, and magnet 30 adapted to fit within recesses of cube holder connection point 25 (right side of FIG. 4). Cube holder connection point 25 is shown as having an octagonal shape to accommodate 8 optical cubes. Also, cube holder connection point 25 has a central hole 26 to receive a spindle to which the cube holder connection point 25 rotates around to permit different faces of cube holder connection point 25 to be coupled to different optical cubes 5. To switch optical cubes in use, a spindle (not shown) rotates the cube holder connection point to move an optical cube into position along the optical axis.

Figure 5B:
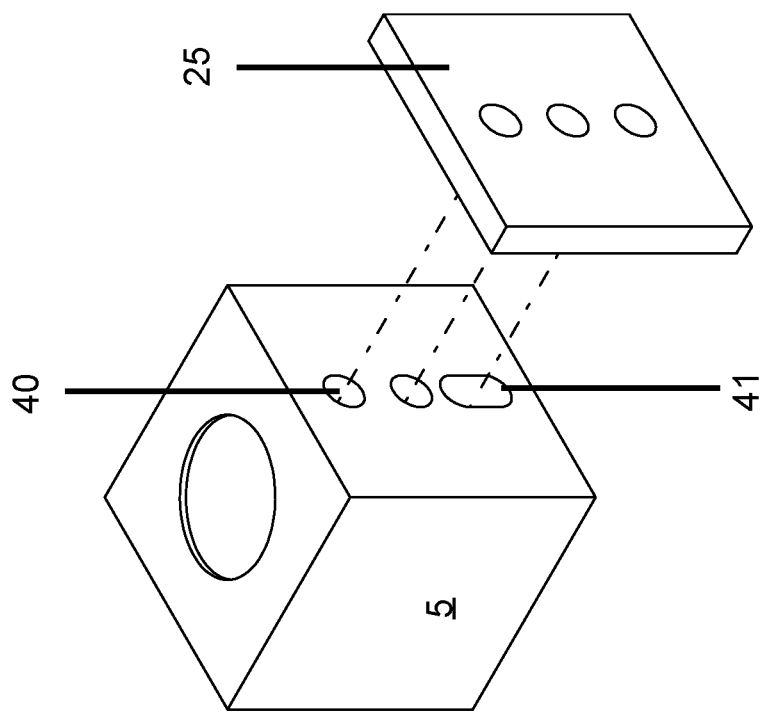
FIGS. 5A and 5B depict embodiment 500 of an optical cube and components of this disclosure.
Figure 5A:
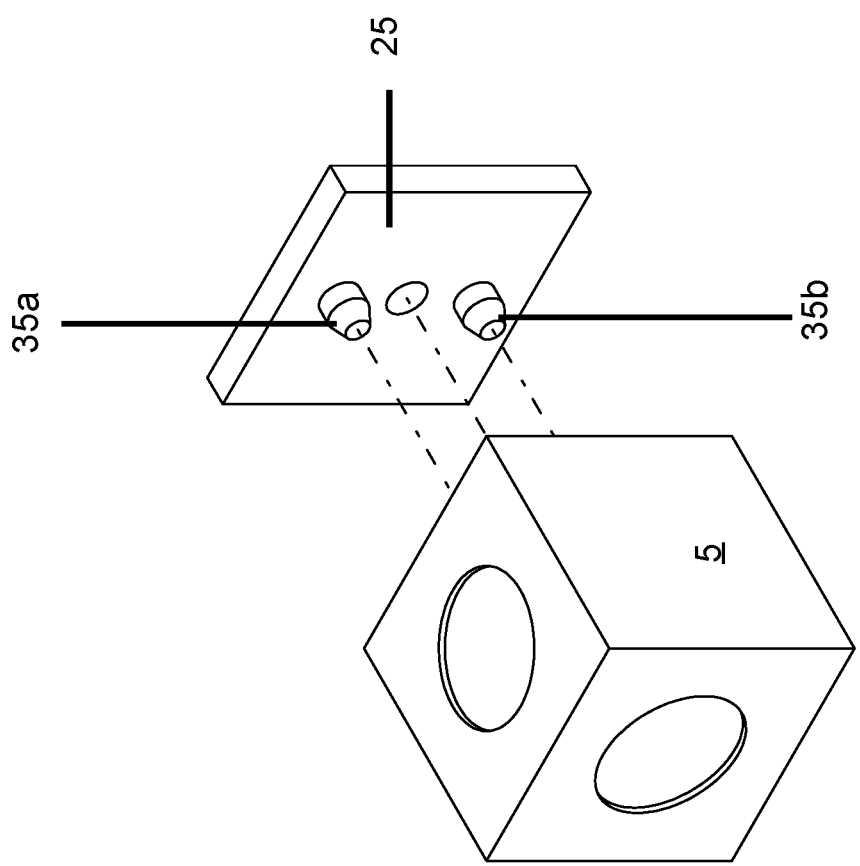

Example 2: Coupler of Optical Cube to Optical Device II with Beveled Locating Pins FIGS. 5A and 5B depict embodiment 500 of a device of this disclosure. FIG. 5A shows optical cube 5 (on left side of FIG. 5) and cube holder connection point 25 having two beveled pins 35a and 35b. FIG. 5B (right side of FIG. 5) shows a different view of embodiment 500, with optical cube 5 having round cavity 40 and slotted cavity 41 shown in alignment with beveled pins in cube holder connection point 25. Two beveled pins (not shown) paired with a hole and a slot in cube 5 constrains 5 degrees of freedom when assembled. Magnetic coupling (not shown) constrains a $6^{th}$ degree of freedom to fully kinematically constrain the optical cube and cube holder connection point together.

Figure 6B:
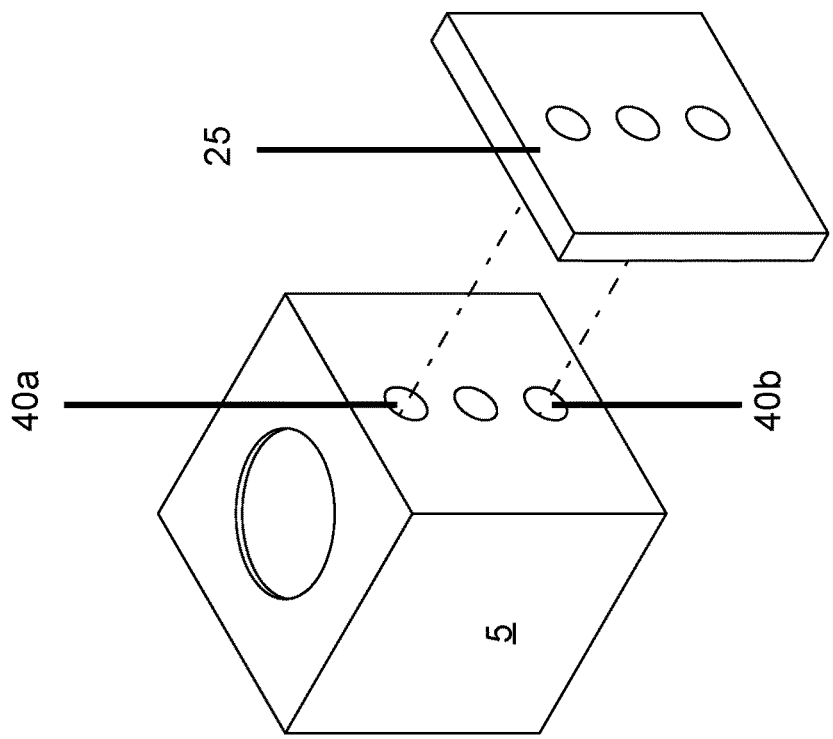
FIGS. 6A and 6B depict alternative embodiments of this disclosure 600.
Figure 6A:
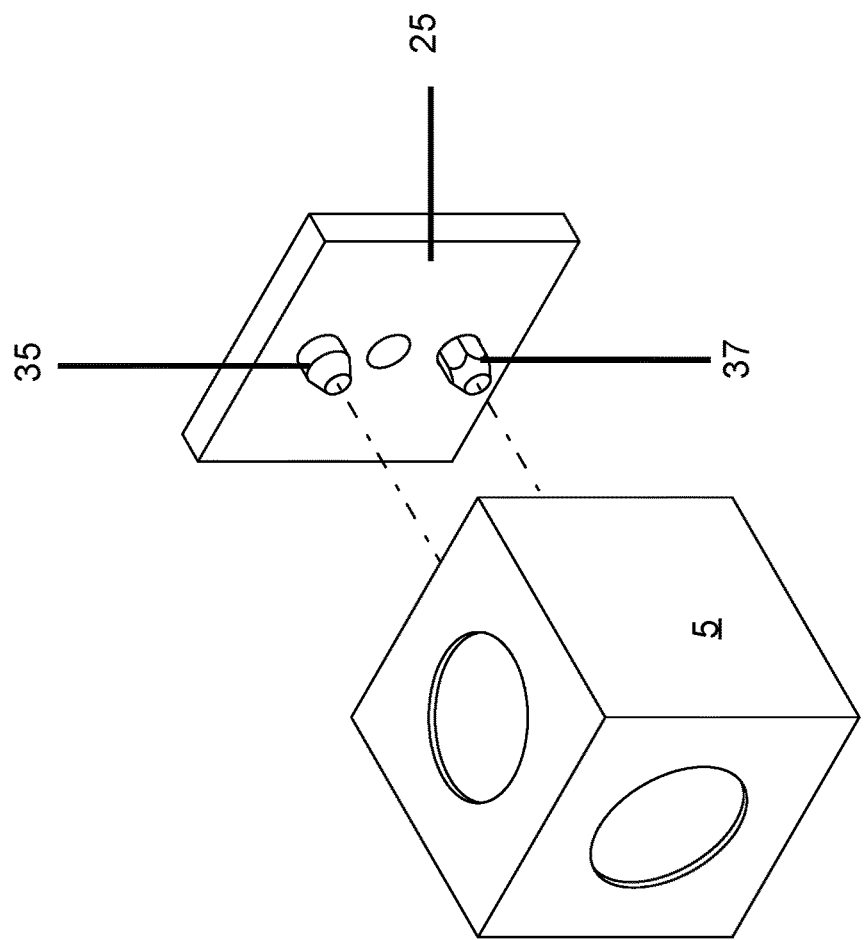

Example 3: Coupler of Optical Cube to Optical Device III with Beveled and Diamond Shaped Locating Pins FIGS. 6A and 6B depict alternative embodiments 600 of this disclosure. FIG. 6A depicts optical cube 5 and cube holder connection point 25 having a diamond shaped locating pin 37 and a beveled pin 35. FIG. 6B (right side of FIG. 6) shows an alternate view of embodiment 600 showing cube holder connection point 25 having a beveled locating pin (not shown) and a diamond shaped locating pin (not shown) and cube 5 in relation with each other. When assembled, beveled locating pin 35 with a round cavity 40*a* constrains 4 degrees of freedom, and a diamond shaped locating pin 37 paired with a round cavity 40*b* constrains an additional 1 degree of freedom, and magnetic coupling (not shown) constrains the 6$^{th}$ degree of freedom to kinematically constrain the optical cube and cube holder connection point together.

Figure 7B:
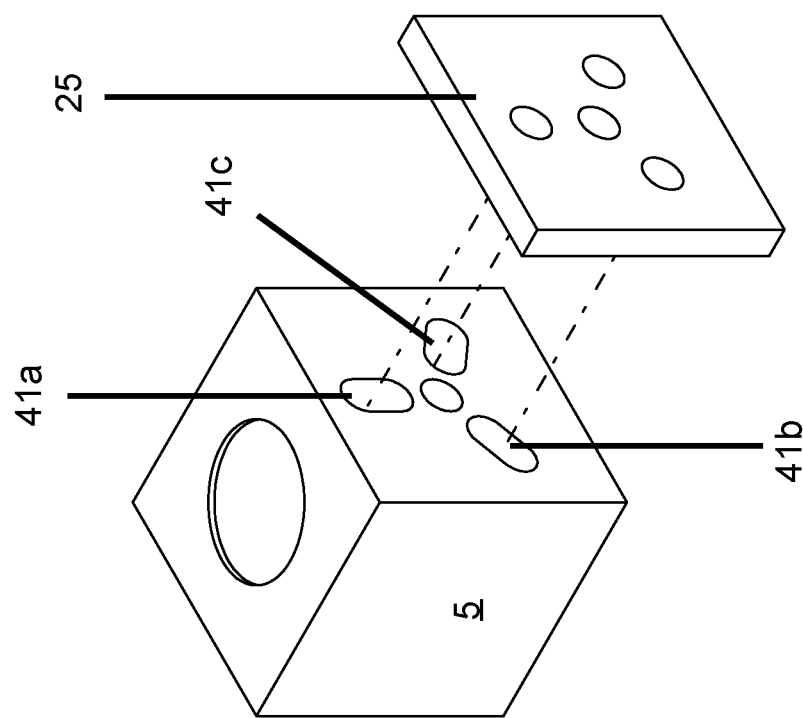
FIGS. 7A and 7B depict an alternative embodiment 700 of this disclosure.
Figure 7A:
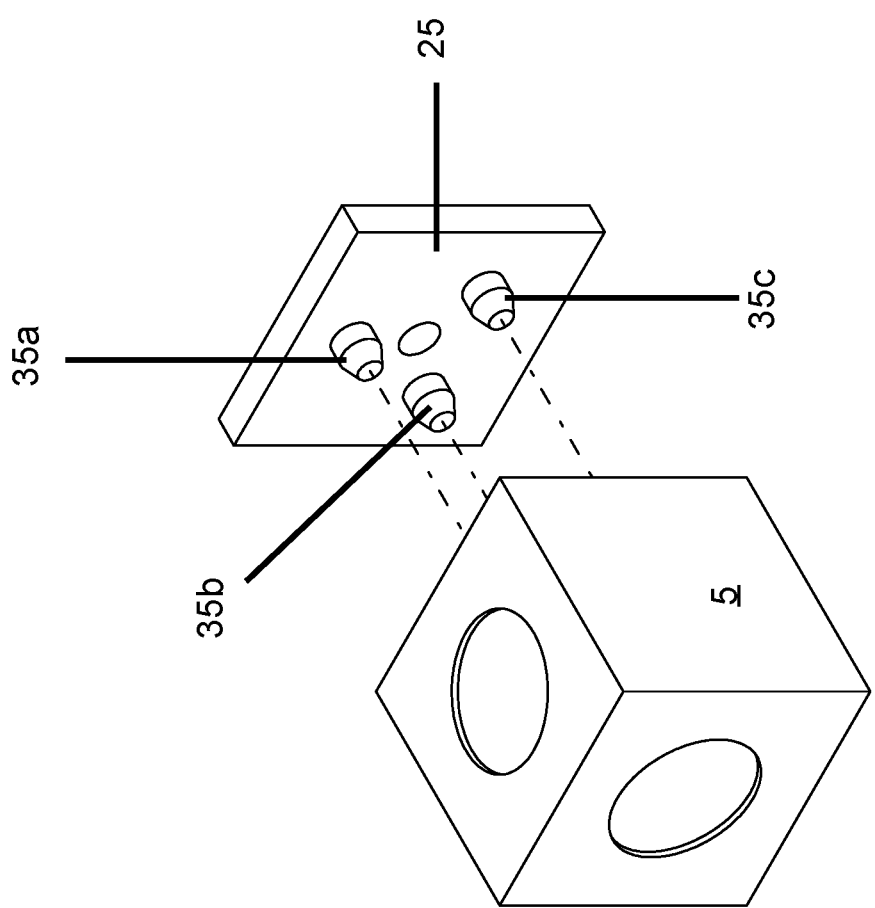

Example 4: Coupler of Optical Cube to Optical Device IV with Beveled Locating Pins and Slotted Cavities FIGS. 7A and 7B depict an alternative embodiment 700 of this disclosure, in which three locating pins are shown. In FIG. 7A, (left side of FIG. 7A), three beveled locating pins 35*a*, 35*b*, and 35*c* are shown on cube holder connection point 25. FIG. 7B shows an alternative view of cube holder connection point 25 and three slots in optical cube 5 to receive beveled pins 35*a*, 35*b*, and 35*c*. Three beveled pins paired with three slots 41*a*, 41*b*, and 41*c* constrain 5 degrees of freedom, and magnetic coupling (not shown) constrains the 6$^{th}$ degree of freedom to fully kinematically constrain the optical cube and cube holder connection point together.

Figure 8B:
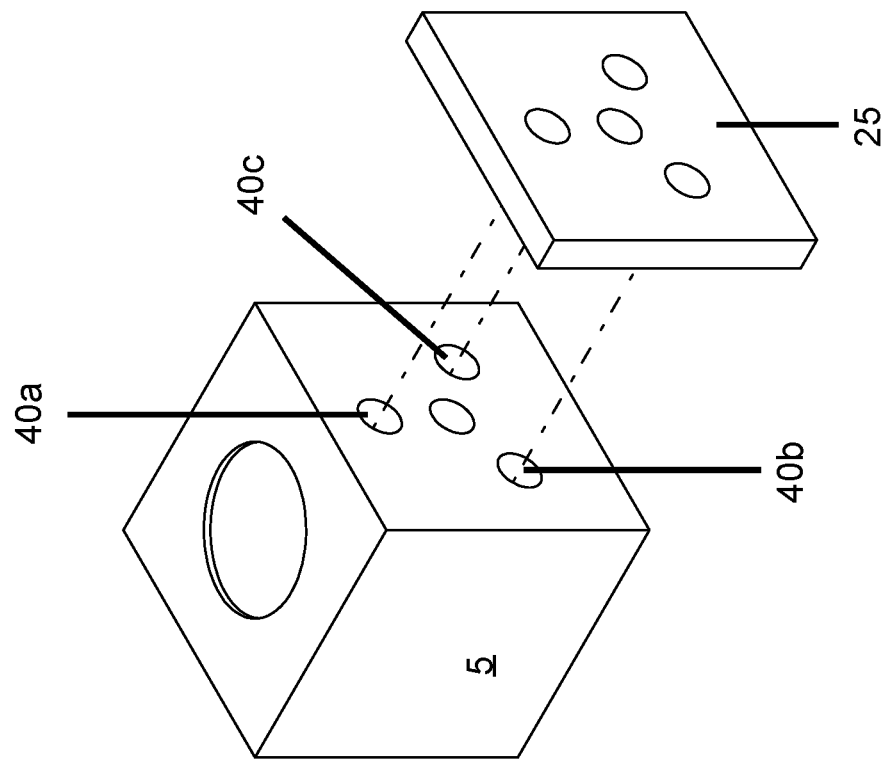
FIGS. 8A and 8B depict an alternative embodiment 800 of this disclosure.
Figure 8A:
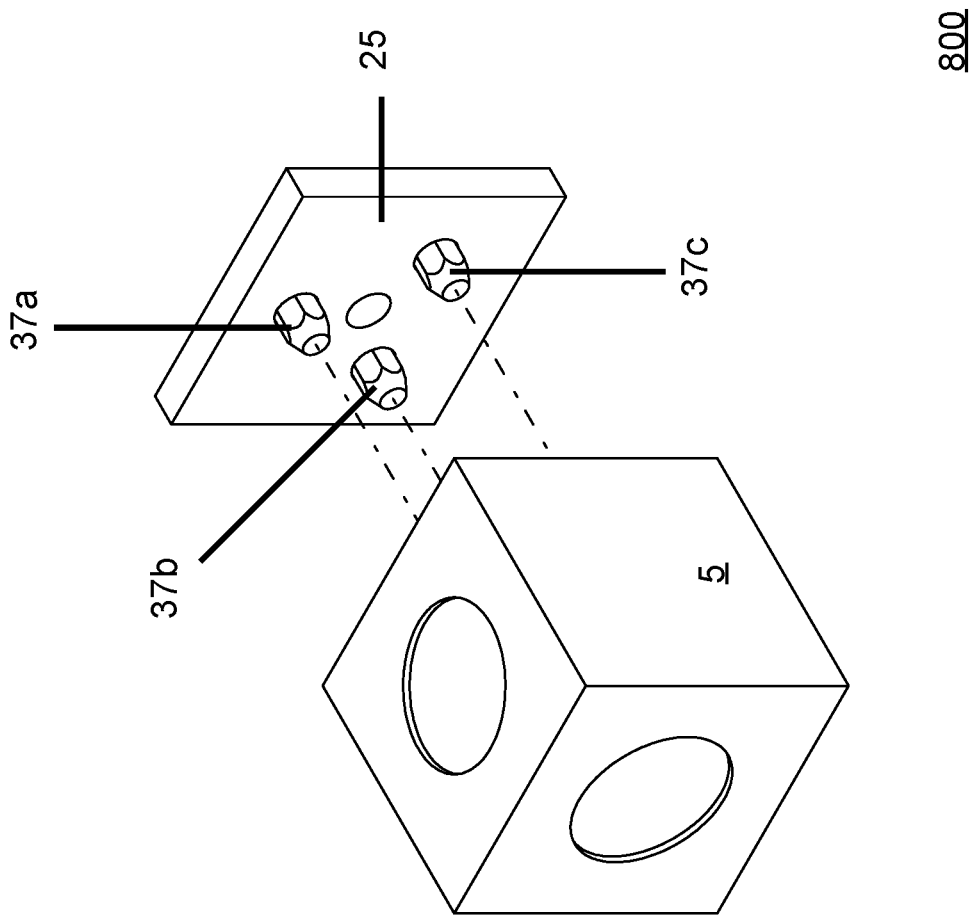

Example 5: Coupler of Optical Cube to Optical Device V with Diamond Shaped Pins FIGS. 8A and 8B depict an alternative embodiment 800 of this disclosure. FIG. 8A shows optical cube 5 and cube holder connection point 25 having three diamond shaped locating pins 37*a*, 37*b*, and 37*c*. FIG. 8B shows an alternative view of optical cube 5 having three holes 40*a*, 40*b*, and 40*c* and cube holder connection point 25 having three diamond shaped locating pins (not shown) aligned to engage cube 5. Three diamond locating pins paired with three holes constrains 5 degrees of freedom, and magnetic coupling (not shown) constrains the 6$^{th}$ degree of freedom to kinematically constrain the optical cube and cube holder connection point together.

Figure 9B:
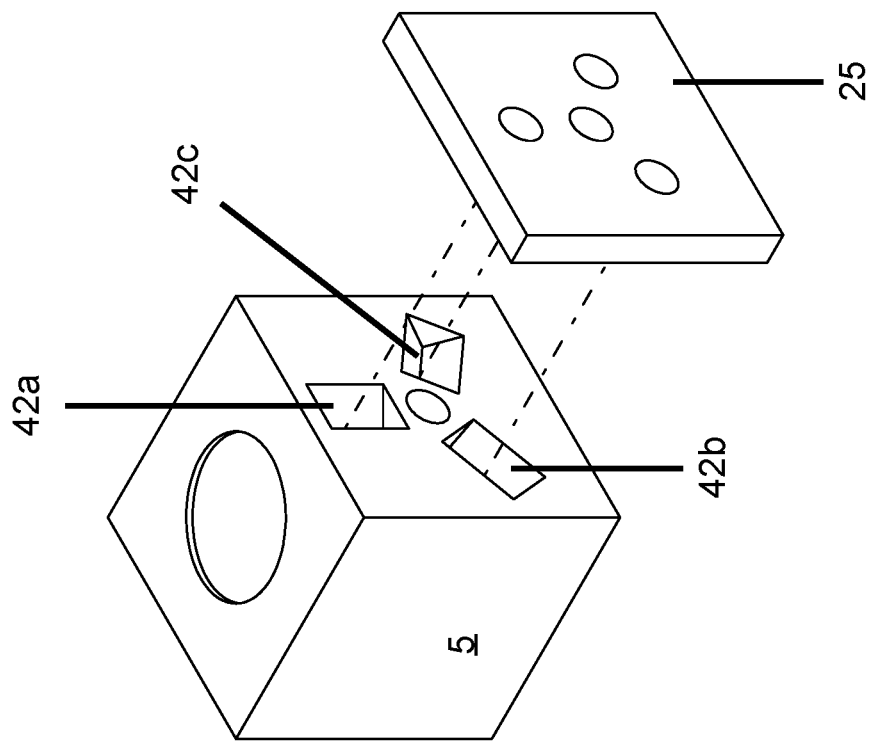
FIGS. 9A and 9B depict an alternative embodiment 900 of this disclosure.
Figure 9A:
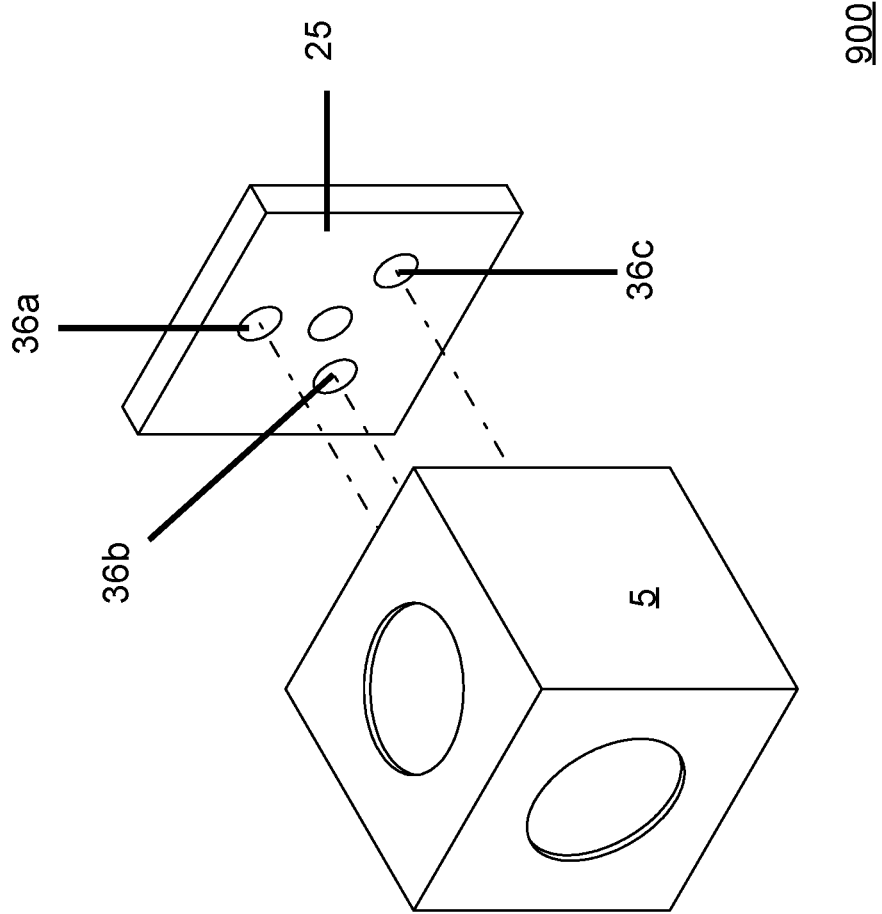

Example 6: Coupler of Optical Cube to Optical Device VI with Round Pins and Grooved Cavities FIGS. 9A and 9B depict an alternative embodiment 900 of this disclosure. FIG. 9A shows optical cube 5 and cube holder connection point 25 having three round pins 36*a*, 36*b* and 36*c*, configured to become paired and engaged with three grooved cavities. FIG. 9B is an alternative view of embodiment 900 with optical cube 5 with cavities 42*a*, 42*b*, and 42*c*, that when assembled, pins 36*a*, 36*b* and 36*c* are fitted into cavities 42*a*, 42*b*, and 42*c*. When assembled, pins 36*a*, 36*b* and 36*c* within cavities 42*a*, 42*b*, and 42*c* constrain 5 degrees of freedom, and magnetic coupling constrains the 6$^{th}$ degree of freedom to fully kinematically constrain the optical cube and cube holder connection point together. It can be appreciated that pins and cavities can be reversed (sides swapped) between the cube holder connection point and optical cube. While various examples have been provided, it can be appreciated that additional pin and cavity combinations can be used within the scope of this disclosure.

Example 7: Alternative Locating Pin Views

FIGS. 10A, 10B, and 10C depict alternative views of a "beveled" pin of embodiment 35 of this disclosure. FIG. 10A is an end view, FIG. 10B is an oblique view, and FIG. 10C is a lateral view of pin 35.

FIGS. 11A, 11B, and 11C depict alternative views of a "diamond shaped" pin of embodiment 37 of this disclosure. FIG. 11A is an end view, FIG. 11B is an oblique view, and FIG. 11C is a lateral view of pin 37.

FIGS. 12A, 12B, and 12C depict alternative views 36 of a round (or spherical) pin. FIG. 12A is an end view, FIG. 12B is an oblique view, and FIG. 12C is a lateral view of pin 36.

FIGS. 13A, and 13B depict alternative views of a round cavity in an embodiment 40 of this disclosure. FIG. 13A is an oblique view, and FIG. 13B is an end view.

FIGS. 14A, and 14B depict alternative views of a slotted cavity of embodiment 41 of this disclosure. FIG. 14A is an oblique view, and FIG. 14B is an end view.

FIGS. 15A, and 15B depict alternative views of a grooved cavity of embodiment 42 of this disclosure. FIG. 15A is an oblique view, and FIG. 15B is an end view.

Example 8: Prior Art Devices

Figure 16:
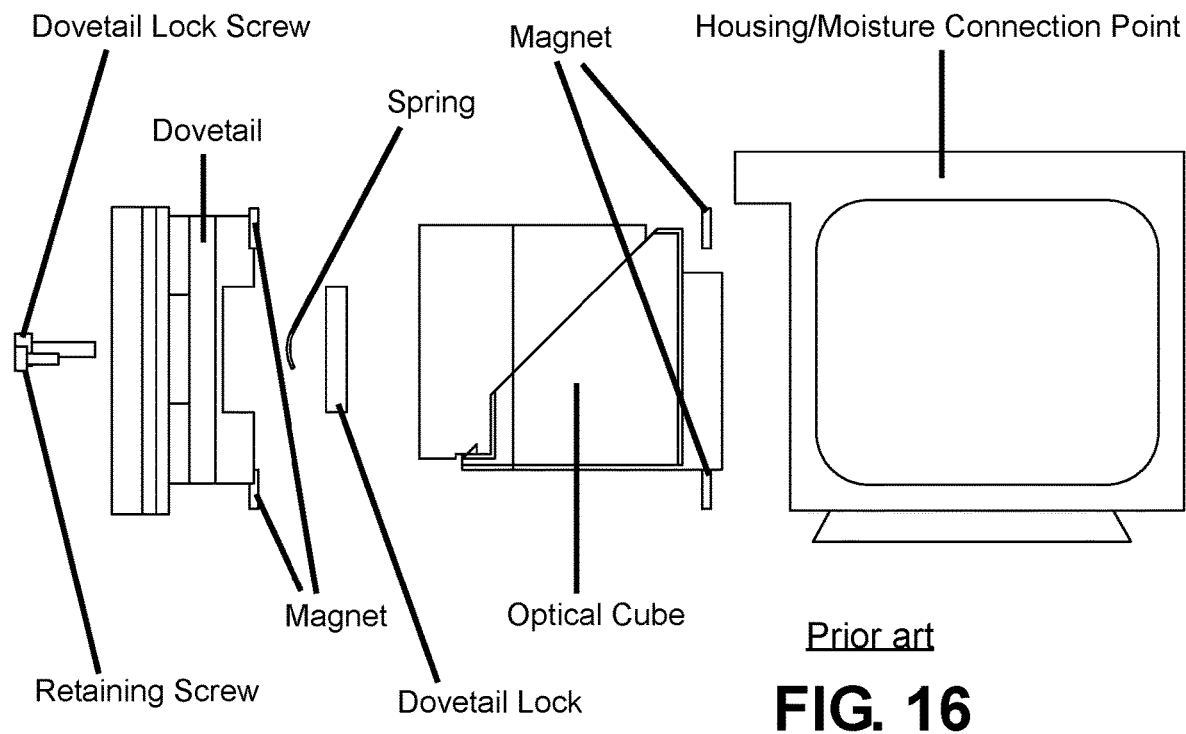
FIG. 16 is a diagram of a filter cube and holder of the prior art. A dovetail coupler and lock screw secure a female dovetail cube to a male dovetail mounting component. A mounting component, with the attached optical cube, is held in place to a housing (cube holder connection point) by use of magnets and screws. Alignment of the mounting component is achieved with the interface between the body cavity and lip on the male dovetails cube mount.

FIG. 16 depicts a prior art device showing a dovetail and dovetail lock screw and spring.

Figure 17:
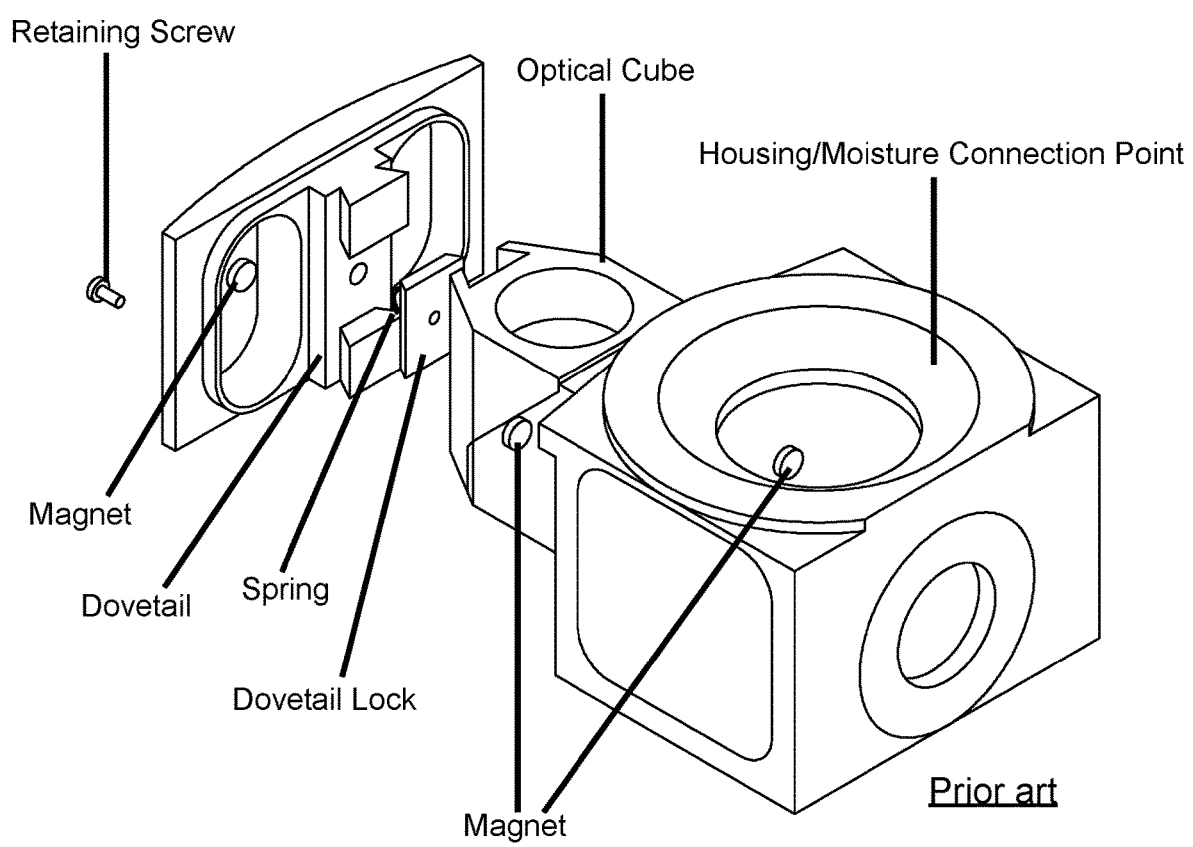
FIG. 17 is an isometric view of an exploded filter cube holder as shown in FIG. 16 of the prior art.

FIG. 17 depicts an alternative view of a prior art device showing a dovetail and dovetail lock retaining screw and spring.

Figure 18:
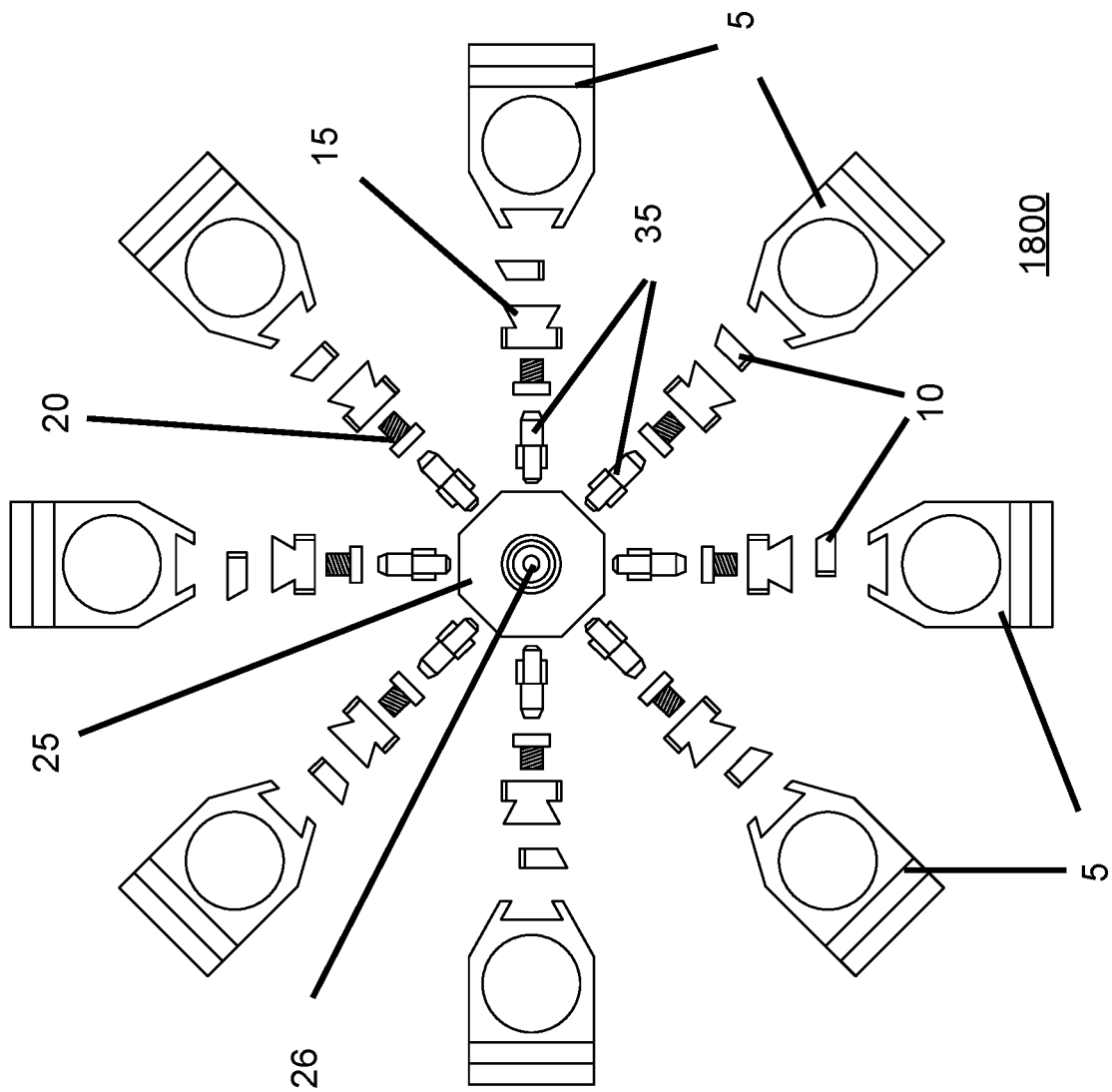
FIG. 18 depicts an embodiment 1800 of this disclosure showing a top exploded view of a rotational cube holder connection point with 8 optical cubes and couplers aligned prior to assembly.

Example 9: Configurations of Cube holder connection points and Optical Cubes FIG. 18 depicts a top, exploded view of a rotational embodiment 1800 of this disclosure. Shown is a cube holder connection point or "hub" 25 with 8 optical cubes 5 and optical cube couplers 15 and optical cube coupling locks 10 in alignment prior to assembly. The cube holder connection point 25 is located in the center of FIG. 18, and has axial longitudinal hole 26 there through, sized to accept a rotatable shaft (not shown) to rotate cube holder connection point 25 to move different optical cubes 5 into position. Pins 35, magnetic components 20, cube couplers 15 and optical cubes 5 are arrayed radially about the cube holder connection point 25.

Figure 19:
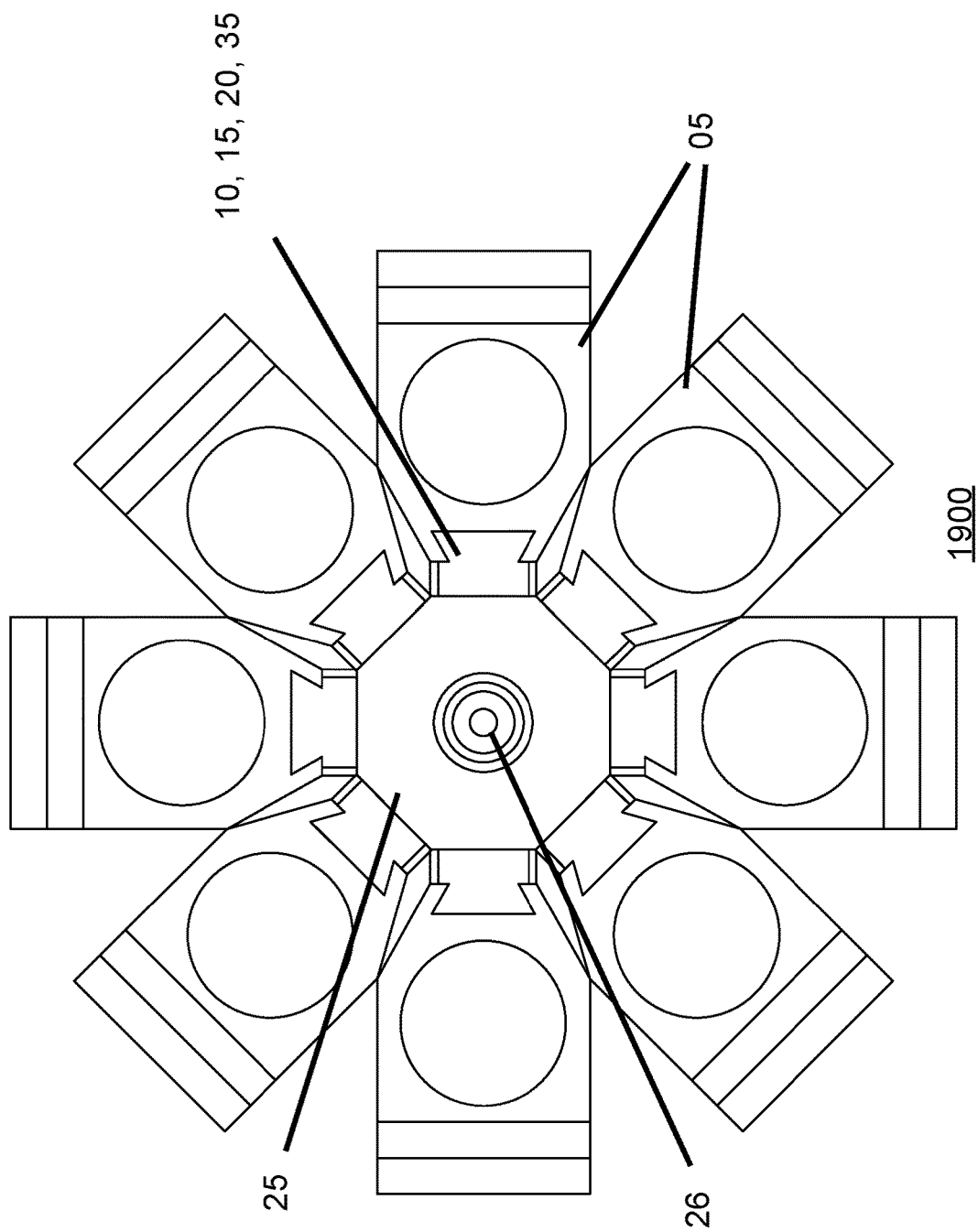
FIG. 19 depicts an embodiment 1900 of this disclosure showing a top view of a rotational cube holder connection point with 8 optical cubes and couplers after assembly.

FIG. 19 depicts a top view of a rotational embodiment 1900 of this disclosure and showing a cube holder connection point (hub) 25 having axial, longitudinal hole 36 and 8 attached optical cubes 5 connected to cube holder connection point 25 with optical cube coupler lock 10, optical cube coupler 15, magnetic component 20, and magnet 30 therebetween.

Figure 20:
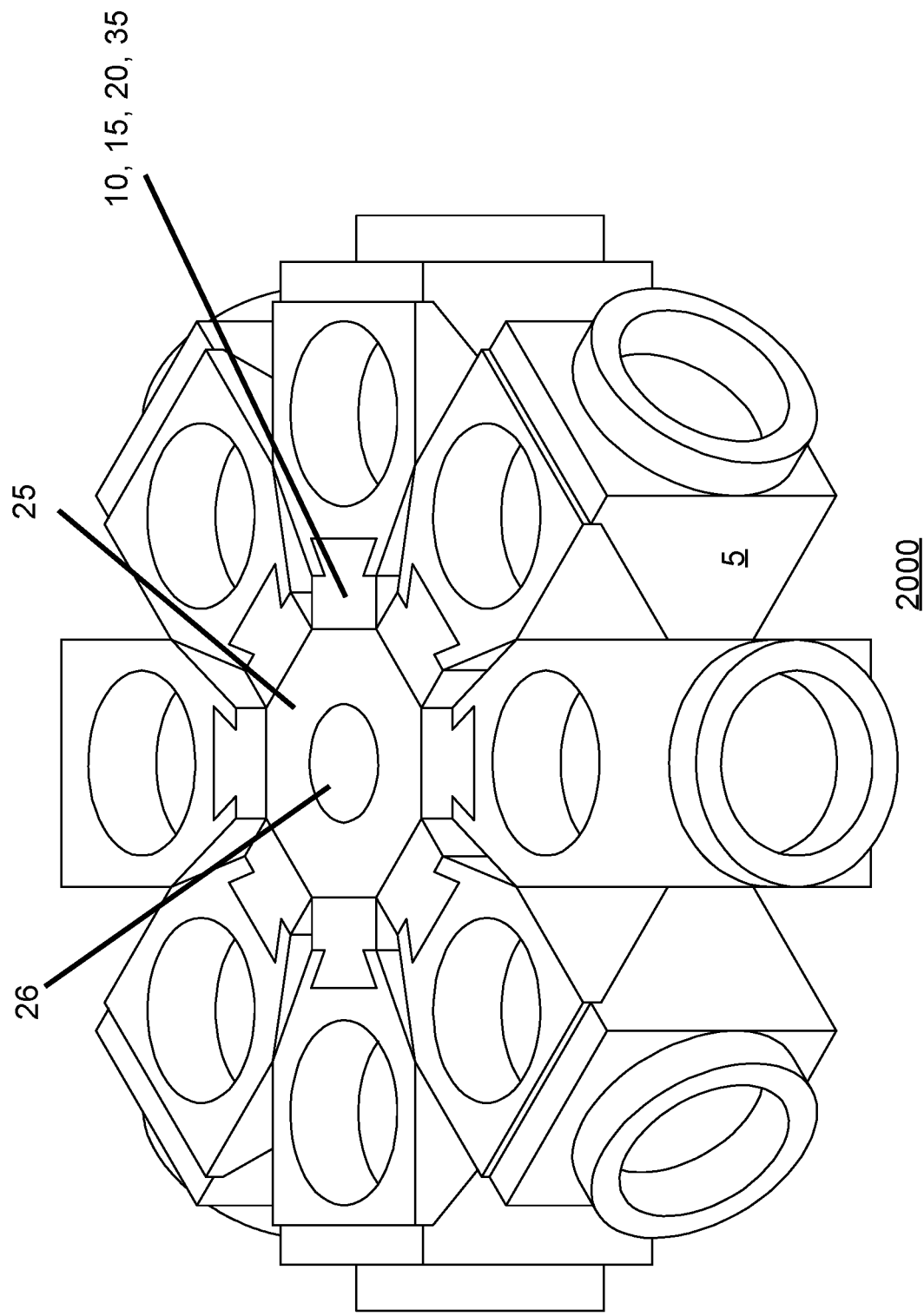
FIG. 20 shows an isometric view of embodiment 2000 of this disclosure showing a rotational cube holder connection point with 8 optical cubes attached thereto.

FIG. 20 shows an isometric view of embodiment 2000 of this disclosure similar to that shown in FIG. 19. Cube holder connection point (hub) 25 having axial, longitudinal hole 26 and 8 attached optical cubes 5 connected to cube holder connection point 25 with optical cube coupler lock 10, optical cube coupler 15, magnetic component 20, and magnet 30 therebetween are shown.

Figure 21:
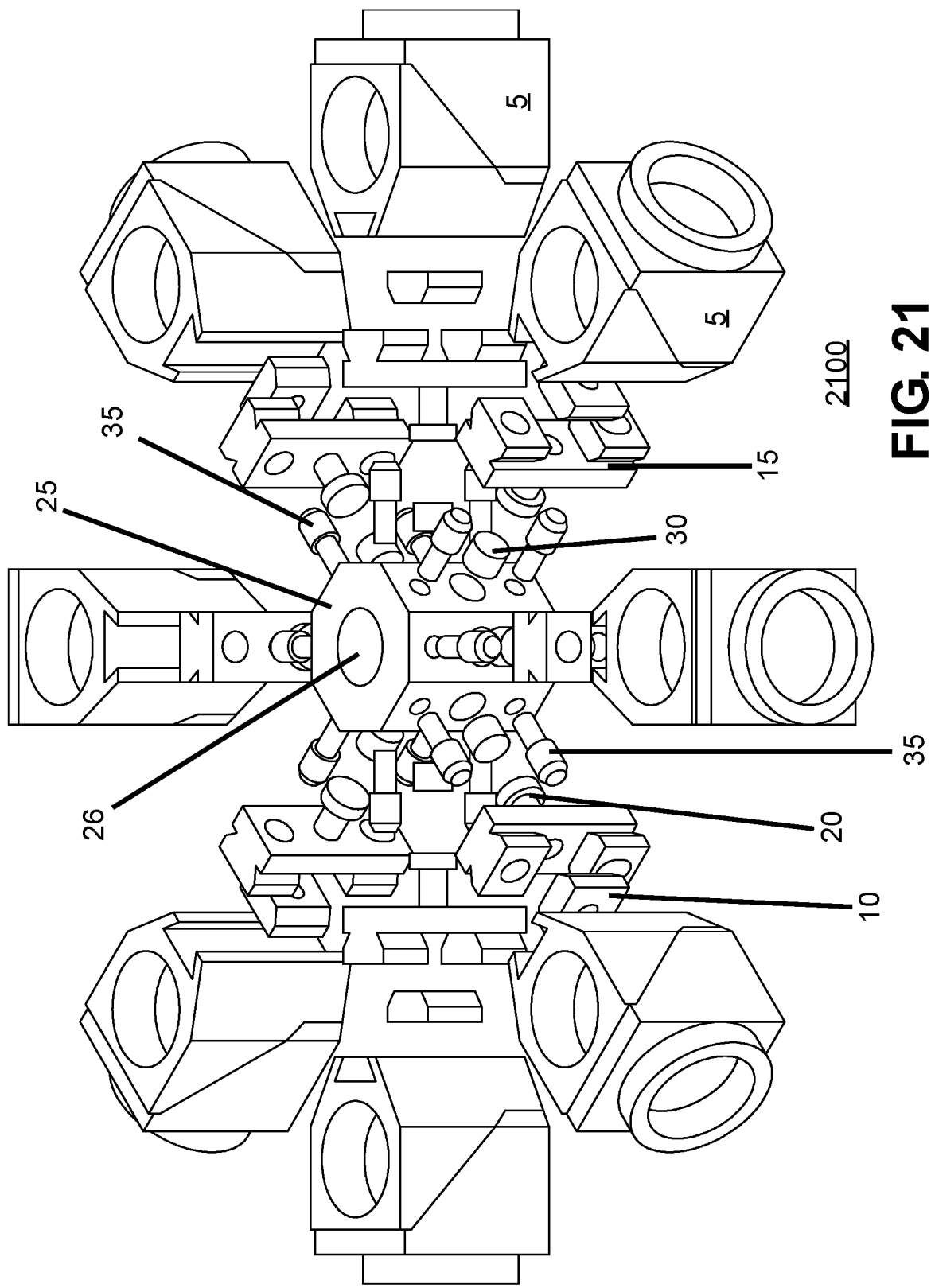
FIG. 21 shows an isometric exploded view of embodiment 2100 of this disclosure with a rotational cube holder connection point and 8 optical cubes placed in relationship to their respective locations on said cube holder connection point prior to assembly.

FIG. 21 depicts an isometric exploded view of embodiment 2100 of this disclosure, similar to that shown in FIG. 20. Optical cubes 5, optical cube coupler locks 10, optical couplers 15, magnetic components 20, magnets 30, cube holder connection point 25 with axial longitudinal hole 26 therethrough and locating pins 35 are shown.

Example 10: Alternative Configurations

As shown in FIG. 3, a cube holder connection point is attached to a slide and a single cube can be moved in and out of position within the optical path. The cube is removable to allow a different cube to be used. Although prior art devices may use a similar approach, they suffer from the requirement to use a dovetail connection and other physical hardware. In contrast, the devices of this disclosure use pins and magnets and do not require additional hardware to keep the optical cube in proper positions.

As shown in FIG. 4, the cube holder connection point (hub) can rotate around the central axis to switch between optical cubes. Certain prior art devices may use a similar approach, however due to using different retainment methods, they do not permit the highest number of cubes in a specific area. The devices and methods described in this disclosure resides within the profile of readily available optical cubes, permitting the highest number of cubes in the smallest area of any automatic cube changer. This method also permits cubes to be changed by pulling perpendicular to the optical axis, further reducing the space requirements and difficulty by requiring no screws or other locking hardware.

Example 11: Configuration of Optical Cubes and Optical Cube Couplers

Figure 22A:
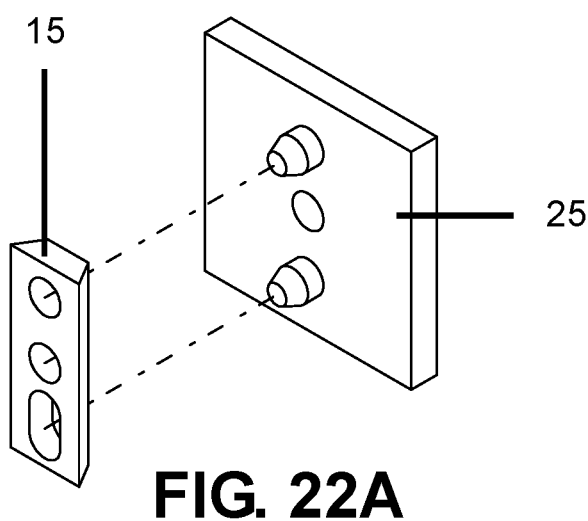
FIGS. 22A, 22B, 22C and 22D depict embodiment 2200 showing the relationship between optical cube coupler 15 as in FIG. 4 (element 15) shaped and sized to fit within a receiving portion of optical cube 5.
Figure 22C:
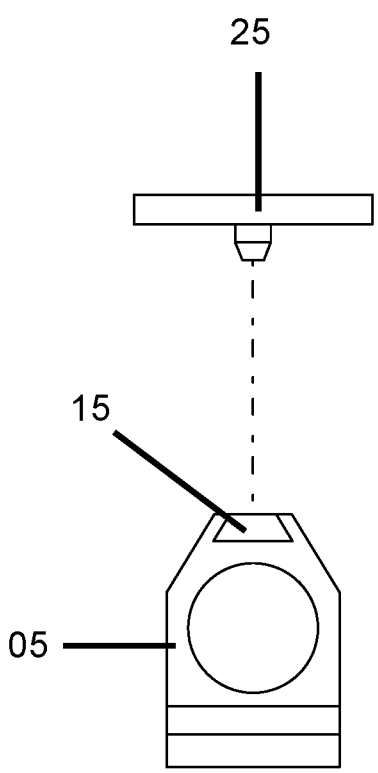
Figure 22B:
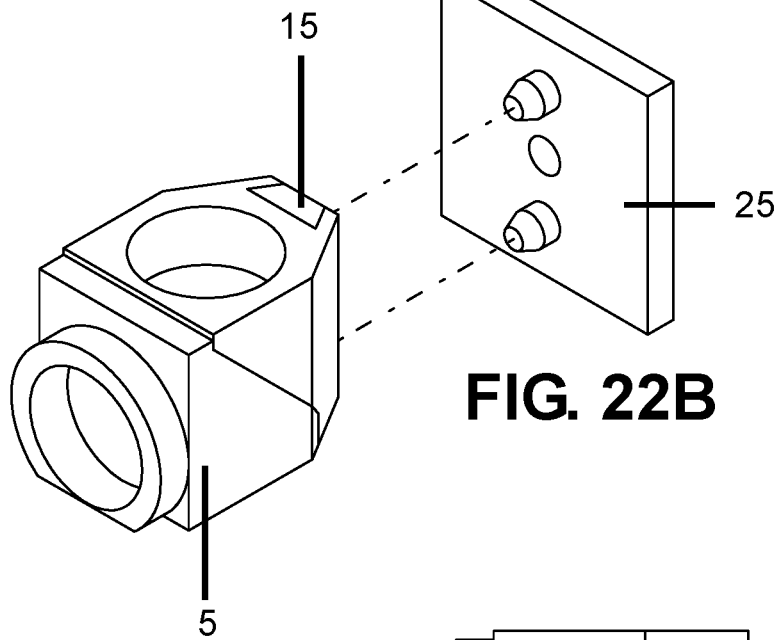
Figure 22D:
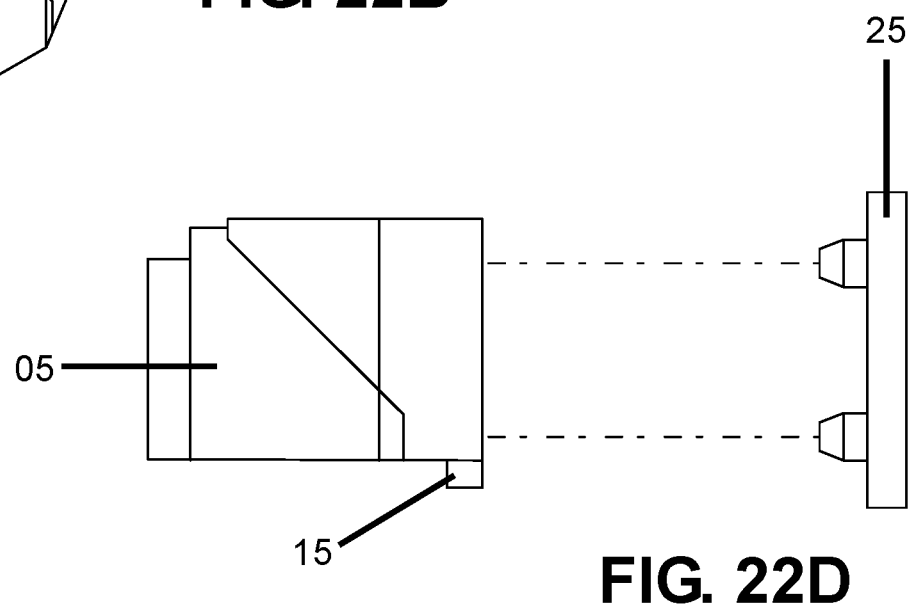

FIGS. 22A, 22B, 22C, and 22D depict embodiment 2200 showing the relationship between optical cube coupler 15 as in FIG. 4 shaped and sized to fit within a receiving portion of optical cube 5. FIG. 22A shows the alignment of locating pins attached to cube holder connection point 25 and aligned with cavities on optical cube coupler 15. FIG. 22B shows optical cube coupler interlocked with optical cube 5. FIG. 22C depicts a top view of optical cube 5, optical cube coupler 15, and cube holder connection point 25. FIG. 22D depicts a side view of an embodiment showing optical cube coupler 15 and optical cube 5 showing pins on cube holder connection point 25 aligned with cavities on optical cube coupler 15 (not shown).

Example 12: Single Optical Cube with Light Source for a Fixed System

Figure 23A:
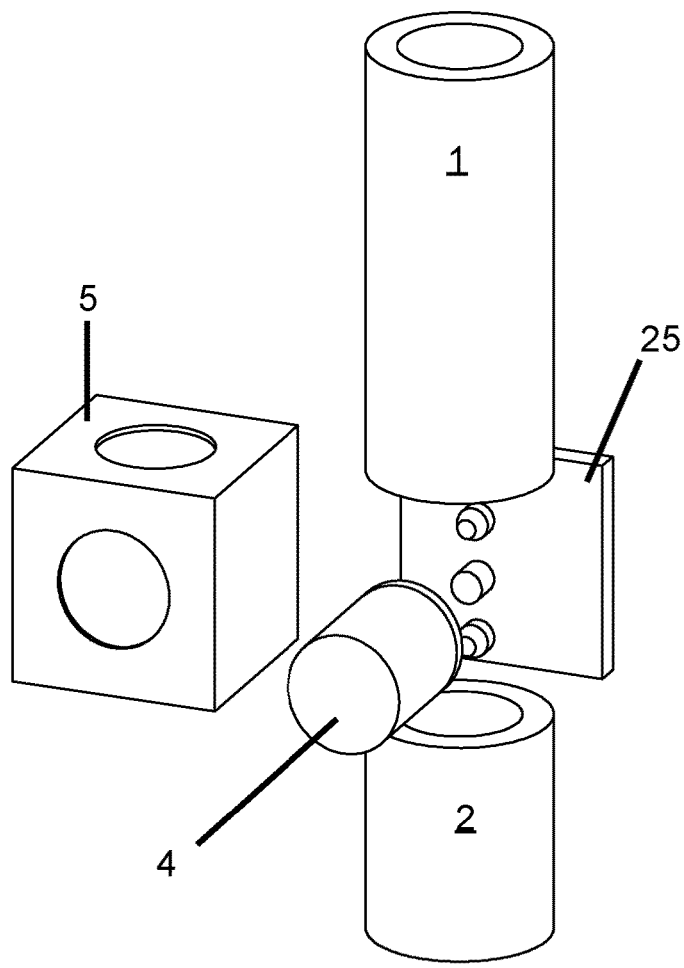
FIGS. 23A and 23B depict an optical cube of embodiment 2300 showing upper optical element 1 aligned to a fixed cube holder connection point 25, which is aligned to lower optical element 2. Light source 4 is shown. Upper optical element 1 can be a zoom and lower optical element 2 can be focus.
Figure 23B:
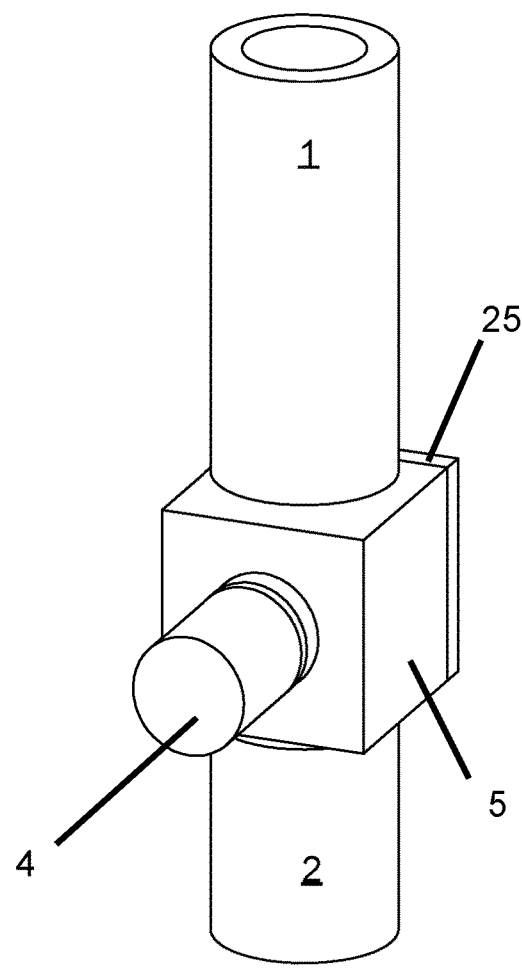

FIGS. 23A and 23B depict an optical cube of embodiment 2300 showing upper optical element 1 aligned to a fixed cube holder connection point 25, which is aligned to lower optical element 2. Light source 4 is shown. Upper optical element 1 can be a zoom and lower optical element 2 can be focus. FIG. 23A shows a fixed system with the optical cube removed. FIG. 23B depicts an assembled optical cube for a fixed system.

Example 13: Translational System with 5 Optical Cubes

Figure 24:
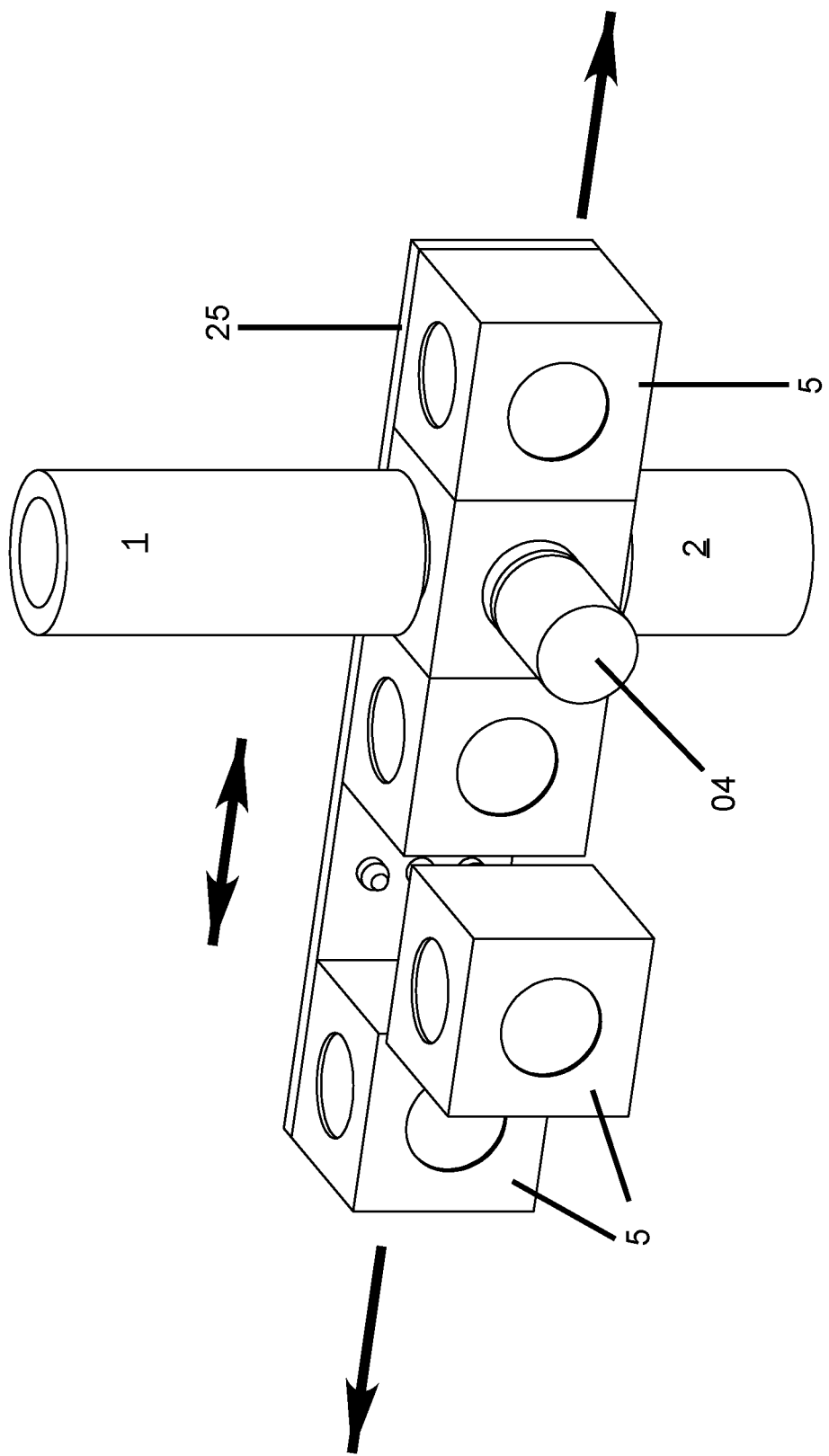
FIG. 24 depicts embodiment 2400 of a translational system of this disclosure. Shown is an assembly of five optical cubes 5 arrayed on a carriage cube holder connection point 25. Top optical element 1, lower optical element 2 and light source 4 are shown aligned to one optical cube 5. Translational movement (double headed arrow) of the carriage cube holder connection point 25 can laterally change the positions of different optical cubes 5.

FIG. 24 depicts embodiment 2400 of a translational system of this disclosure. Shown is a view of a partially assembled translational system of five optical cubes 5 (shown with one optical cube 5 not attached) arrayed on a carriage cube holder connection point 25. Top optical element 1, lower optical element 2 and light source 4 are shown aligned to one optical cube 5. Translational movement (double headed arrow) of the carriage cube holder connection point 25 can laterally change the positions of different optical cubes 5.

Example 14: Rotational System with 8 Optical Cubes

Figure 25:
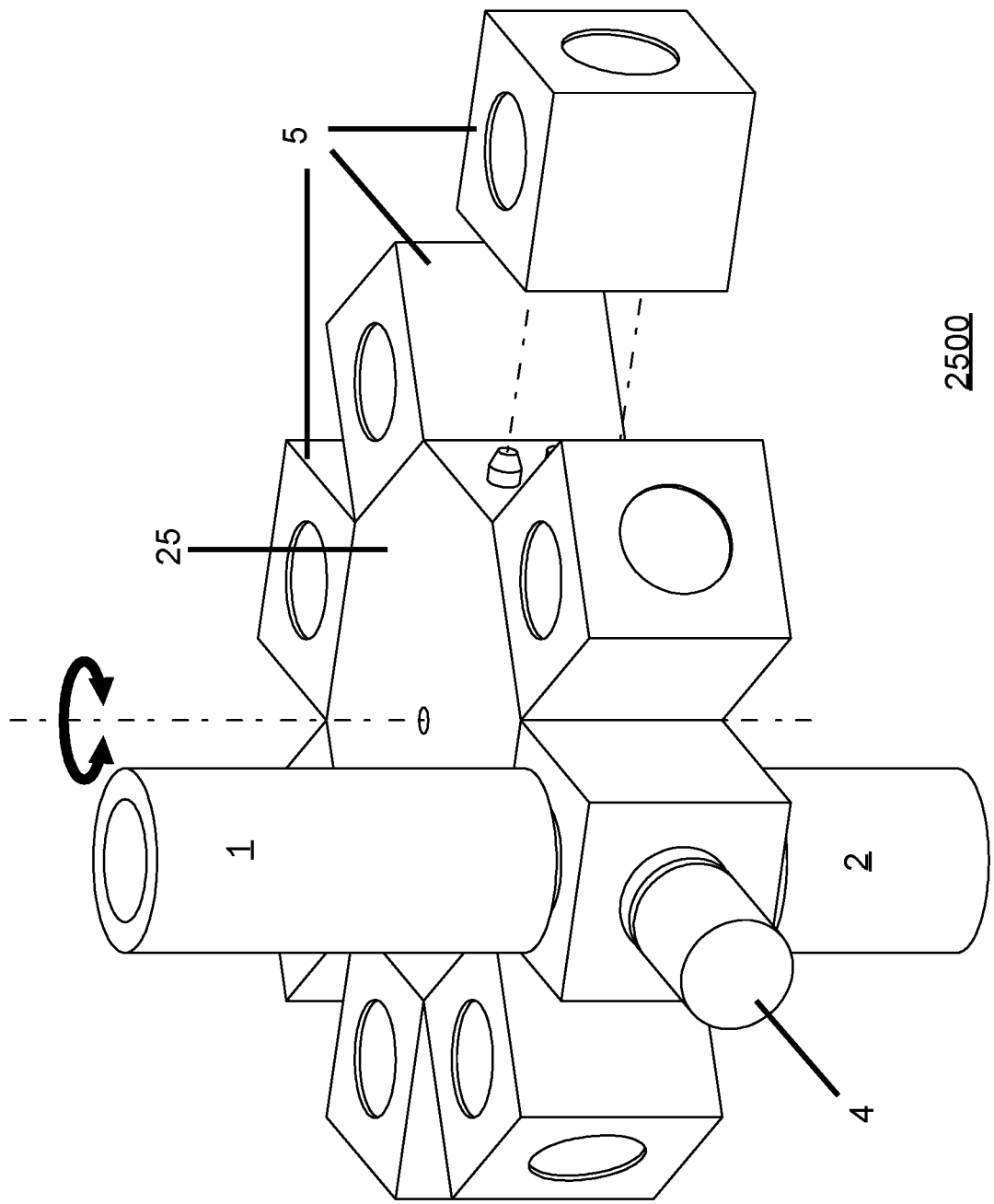
FIG. 25 depicts embodiment 2500 of a rotational system of this disclosure. Shown is a view of an assembled rotational system, with upper optical element 1, lower optical element 2, 8 optical cubes 5, spindle (cube holder connection point) 25, with the vertical dashed line being the axis of rotation of system 2500. Upper optical element 1, lower optical element 2, and light source 4 are shown aligned to one of optical cubes 5. Rotation (double arrow) of system 2500 around the vertical dashed line moves different optical cubes into different positions.

FIG. 25 depicts embodiment 2500 of a rotational system of this disclosure. Shown is a view of a partially assembled rotational system (shown with one optical cube 5 not attached), with upper optical element 1, lower optical element 2, 8 optical cubes 5, spindle (cube holder connection point) 25, with the vertical dashed line being the axis of rotation of system 2500. Upper optical element 1, lower optical element 2, and light source 4 are shown aligned to one of optical cubes 5. Rotation (double headed arrow) of system 2500 around the vertical dashed line moves different optical cubes into different positions.

We claim:

1. A coupler system for an optical device, comprising:
    a) a cube coupler for attaching an optical cube to an optical device having a light source;
    b) a cube coupler connection point comprising:
        1) a plurality of lateral faces; and
        2) a concentric longitudinal hole through said cube coupler connection point, said hole adapted to receive a spindle of said optical device;
    c) a plurality of pins in cube coupler connection point;
    d) a plurality of cavities located said optical cube that are sized and configured to accept said pins;
    e) a magnet located on said cube coupler connection point to attract and adhere to a magnetic component attached to said cube coupler; and
    f) where said elements a) through e), when assembled constrain the optical cube and cube coupler connection point in 6 degrees of freedom.

2. The coupler system of claim 1, where at least one of said lateral faces of said cube coupler connection point has an optical cube affixed thereto.

3. The coupler system of claim 1, wherein another lateral face of said cube coupler connection point has another optical cube thereon, wherein said each of said optical cubes has a mirror, and/or optional filters specific for different wavelengths of light.

4. The coupler system of claim 1, wherein a plurality of optical cubes are attached to different lateral faces of said cube coupler connection point, where each optical cube has a mirror, and/or filters, specific for different wavelengths of light.

5. The coupler system of claim 1, wherein said optical cube and said cube coupler connection point have a plurality of pins and cavities to receive said pins.

6. The coupler system of claim 1, where an optical cube coupler is used to engage an optical cube using said pins and cavities.

7. The coupler system of claim 1, where said pins have a shape of beveled, or round, or diamond, or mixtures thereof, and where each of said cavities is shaped and sized to receive a corresponding pin.

8. The coupler system of claim 1, where said pins are affixed to said cube coupler connection point and said cavities are located on said optical cube.

9. The coupler system of claim 1, where said pins are affixed to said optical cube and said cavities are located on said cube coupler connection point.

10. The coupler system of claim 1, where pin/cavity combinations comprise a cube coupler having one or more pins configured to engage with one or more cavities on a connection point and said cube coupler has one or more cavities configured to engage with one or more pins of a connection point, and where said connection point can have one or more cavities configured to engage with one or more pins of said cube coupler and where one or more pins on said connection point are configured to engage one or more cavities on said cube coupler, so that pins and cavities are not all required to be located on different elements.

11. The coupler system of claim 1, wherein said light source is a light emitting diode (LED), or fluorescent, or halogen, or incandescent, or laser.

12. A method for attaching an optical cube to a coupler system having a light source, comprising the steps:
   a) providing said optical cube;
   b) providing an optical cube coupler;
   c) providing an optical cube coupler lock located between said optical cube coupler and said optical cube;
   d) providing a cube coupler connection point having a plurality of locating pins;
   e) said optical cube having a plurality of cavities sized and configured to accept said pins;
   f) providing a magnet coupled to said cube coupler connection point;
   g) providing a magnetic component located on said optical cube coupler to attract and adhere to said magnet;
   h) combining said steps b) through g) together with said optical cube;
   i) where said steps a) through h) when assembled constrain the optical cube and the cube coupler connection point in 6 degrees of freedom.

13. A method for analyzing a substance using an optical device with coaxial illumination and having a light source associated with said optical device, comprising:
   a) said optical device with coaxial illumination;
   b) preparing one or more optical cubes, optical cube couplers, a plurality of pins, and a cube coupler connecting point;
   c) affixing said one or more optical cubes and optical cube couplers to said cube coupler connection points to constrain said optical cubes, optical couplers and said cube coupler connection points to 6 degrees of freedom, thereby producing completed cube coupler connection points with said optical cubes attached thereto;
   d) placing said completed cube coupler connection point on a spindle of a rotational device, or a translational device; and
   e) detecting reflected or emitted light from a sample using one of said optical cubes;
   f) rotating or moving translationally said cube coupler connection point to place a different optical cube within the light path; and
   g) detecting the reflected or emitted light from said sample using another of said optical cubes.

14. A method for attaching an optical cube to a coupler system having a light source, comprising the steps:
   a) providing said optical cube;
   b) providing an optical cube coupler;
   c) providing an optical cube coupler lock located between said optical cube coupler and said optical cube;
   d) said optical cube having a plurality of locating pins;
   e) said optical cube coupler having a plurality of cavities sized and configured to accept said pins;
   f) providing a magnet coupled to said cube coupler connection point;
   g) providing a magnetic element located on said optical cube to attract and adhere to said magnet;
   h) attaching said components together with said optical cube;
   i) where said elements a) through h) when assembled constrain the optical cube and cube coupler connection point in 6 degrees of freedom.

* * * * *